United States Patent
Yonekawa et al.

(10) Patent No.: US 10,648,922 B2
(45) Date of Patent: May 12, 2020

(54) CRACK ANALYSIS DEVICE, CRACK ANALYSIS METHOD, AND CRACK ANALYSIS PROGRAM

(71) Applicants: Kabushiki Kaisha Toshiba, Tokyo (JP); Toshiba Infrastructure Systems & Solutions Corporation, Kawasaki-shi, Kanagawa (JP)

(72) Inventors: Yoko Yonekawa, Tokyo (JP); Nobuyuki Kumakura, Kanagawa (JP); Takahiko Yamazaki, Chiba (JP); Shingo Yasunami, Chiba (JP)

(73) Assignees: Kabushiki Kaisha Toshiba, Tokyo (JP); Toshiba Infrastructure Systems & Solutions Corporation, Kawasaki-shi, Kanagawa (JP)

( * ) Notice: Subject to any disclaimer, the term of this patent is extended or adjusted under 35 U.S.C. 154(b) by 185 days.

(21) Appl. No.: 15/745,646

(22) PCT Filed: Jul. 21, 2016

(86) PCT No.: PCT/JP2016/071455
§ 371 (c)(1),
(2) Date: Jan. 17, 2018

(87) PCT Pub. No.: WO2017/014288
PCT Pub. Date: Jan. 26, 2017

(65) Prior Publication Data
US 2018/0195973 A1    Jul. 12, 2018

(30) Foreign Application Priority Data

Jul. 21, 2015 (JP) .................................. 2015-144224
Nov. 30, 2015 (JP) .................................. 2015-234332

(51) Int. Cl.
*G01N 21/88* (2006.01)
*E01C 23/01* (2006.01)
(Continued)

(52) U.S. Cl.
CPC ......... *G01N 21/8851* (2013.01); *E01C 23/01* (2013.01); *G01B 11/30* (2013.01);
(Continued)

(58) Field of Classification Search
CPC .... G01N 21/8851; G01N 21/88; G01N 21/95; G01N 2021/8858; G01N 2021/8861; E01C 23/01; G01B 11/30
See application file for complete search history.

(56) References Cited

U.S. PATENT DOCUMENTS 6,711,284 B1    3/2004  Koide
9,488,592 B1 *  11/2016 Maresca ............ G01N 21/8851
(Continued)

FOREIGN PATENT DOCUMENTS

CN  101300459 A    11/2008
CN  103290766 A     9/2013
(Continued)

OTHER PUBLICATIONS

Toshiba, Toshiba News & Topics, Jun. 29, 2015 (3 pages).
(Continued)

*Primary Examiner* — Thai Q Tran
*Assistant Examiner* — Sunghyoun Park
(74) *Attorney, Agent, or Firm* — Baker Botts L.L.P.

(57) ABSTRACT

A crack analysis device includes a captured image acquiring unit, a crack detecting unit, and a crack ratio calculator. The captured image acquiring unit acquires a captured image which is obtained by imaging a road surface. The crack detecting unit detects cracks in the imaged road surface on the basis of the captured image. The crack ratio calculator (Continued)

calculates a crack ratio indicating a ratio of an area of the cracks to a predetermined area on the basis of the detected cracks.

25 Claims, 21 Drawing Sheets

(51) Int. Cl.
    *G01B 11/30*     (2006.01)
    *G01N 21/95*     (2006.01)

(52) U.S. Cl.
    CPC .............. *G01N 21/88* (2013.01); *G01N 21/95* (2013.01); *G01N 2021/8858* (2013.01); *G01N 2021/8861* (2013.01)

(56) References Cited

U.S. PATENT DOCUMENTS

| | | | |
|---|---|---|---|
| 2003/0069668 A1* | 4/2003 | Zurn | E01C 19/006 700/245 |
| 2004/0252864 A1* | 12/2004 | Chang | G06K 9/00624 382/104 |
| 2006/0276985 A1 | 12/2006 | Xu et al. | |
| 2007/0048084 A1* | 3/2007 | Jung | G09F 9/30 404/9 |
| 2009/0262145 A1 | 10/2009 | Akita et al. | |
| 2009/0279842 A1 | 11/2009 | Liao et al. | |
| 2010/0177191 A1* | 7/2010 | Stier | G01N 21/8806 348/92 |
| 2013/0033603 A1 | 2/2013 | Suzuki et al. | |
| 2013/0169794 A1* | 7/2013 | Shimomura | E01C 23/01 348/128 |
| 2013/0173208 A1* | 7/2013 | Kuzunishi | G08G 1/0112 702/141 |
| 2015/0116481 A1* | 4/2015 | Troy | G01N 21/88 348/128 |
| 2015/0269438 A1* | 9/2015 | Samarasekera | G06K 9/00637 382/154 |
| 2016/0054233 A1* | 2/2016 | Bense | G01N 25/72 250/330 |
| 2016/0125612 A1 | 5/2016 | Seki et al. | |
| 2016/0133007 A1 | 5/2016 | Kuratate et al. | |
| 2016/0133008 A1 | 5/2016 | Kuratate et al. | |
| 2016/0358384 A1* | 12/2016 | Marche | G06T 19/20 |

FOREIGN PATENT DOCUMENTS

| | | |
|---|---|---|
| CN | 103369286 A | 10/2013 |
| CN | 104504388 A | 4/2015 |
| CN | 104537651 A | 4/2015 |
| JP | 04-240555 A | 8/1992 |
| JP | 09-096515 A | 4/1997 |
| JP | 09-196647 A | 7/1997 |
| JP | 2005-221883 A | 8/2005 |
| JP | 2008-015653 A | 1/2008 |
| JP | 2008-046065 A | 2/2008 |
| JP | 2010-176705 A | 8/2010 |
| JP | 2010-287156 A | 12/2010 |
| JP | 2011-032678 A | 2/2011 |
| JP | 2011179874 A | 9/2011 |
| JP | 2012-184624 A | 9/2012 |
| JP | 2013-079889 A | 5/2013 |
| JP | 2014-089078 A | 5/2014 |
| JP | 5551236 B | 7/2014 |
| JP | 2016-090333 A | 5/2016 |
| JP | 2016-090547 A | 5/2016 |
| JP | 2016-090548 A | 5/2016 |
| WO | 2011/108052 A1 | 9/2011 |

OTHER PUBLICATIONS

Ministry of Land, Infrastructure, Transport and Tourism Road Bureau, So Tenken Jisshi Yoryo(An) [Hoso Hen] (Sanko Shiryo), Feb. 2013 (5 pages).
International Search Report issued in PCT Application No. PCT/JP2016/071455, dated Sep. 20, 2016 (4 pages).
Search report issued in corresponding EP application No. 16827848.9, dated Mar. 18, 2019, 15 pages.
Ministry of Land, Infrastructure, Transport and Tourism Road Bureau, So Tenken Jisshi Yoryo(An) [Hoso Hen], Feb. 2013, pp. 1-9.
Office Action issued in Japanese application No. 2018-001520 dated Jun. 18, 2019, 18 pages.
Extended European Search Report issued in EP application No. 16827848.9, dated Jun. 21, 2019, 19 pages.

\* cited by examiner

FIG. 1
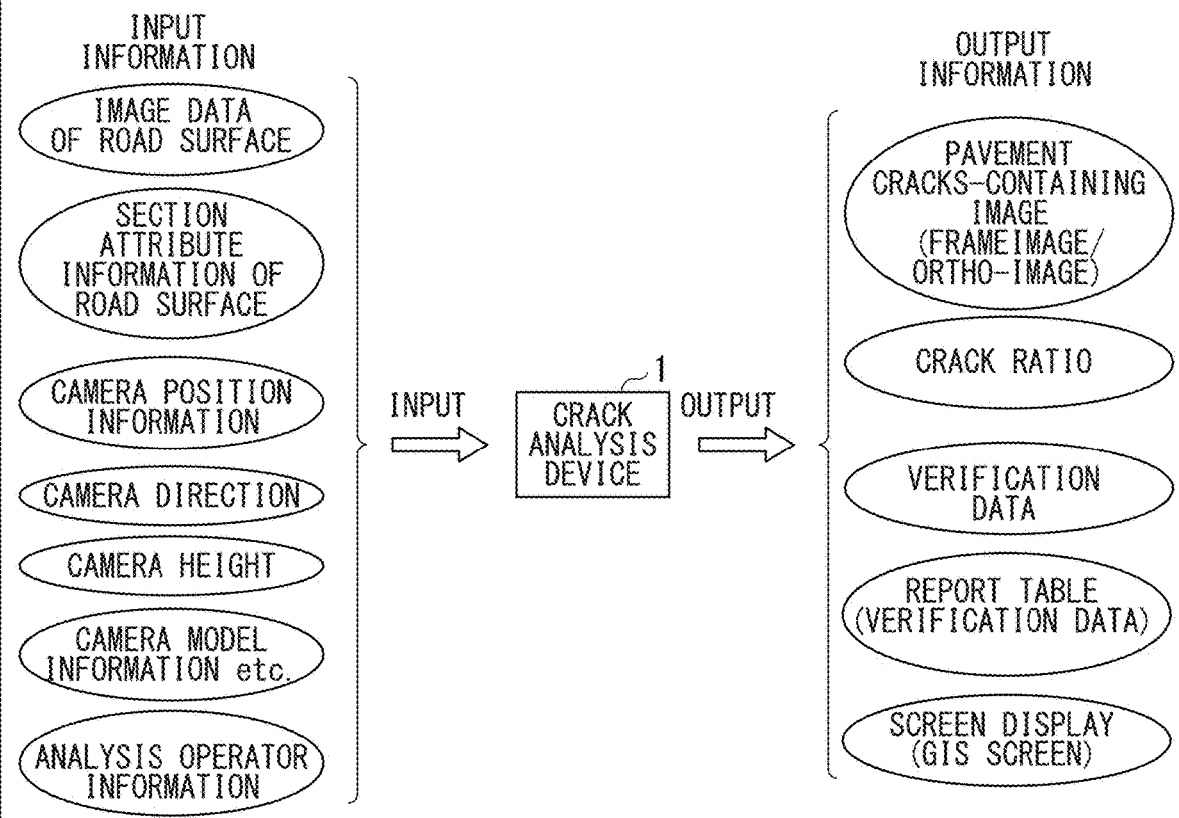
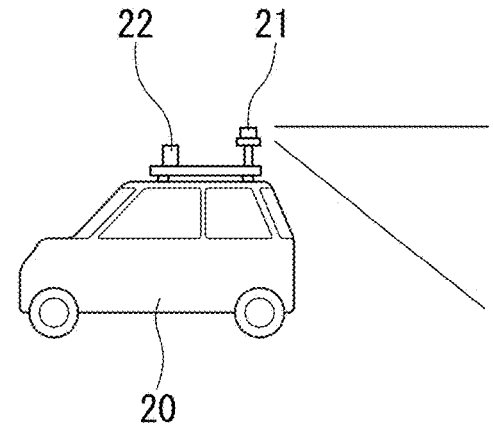
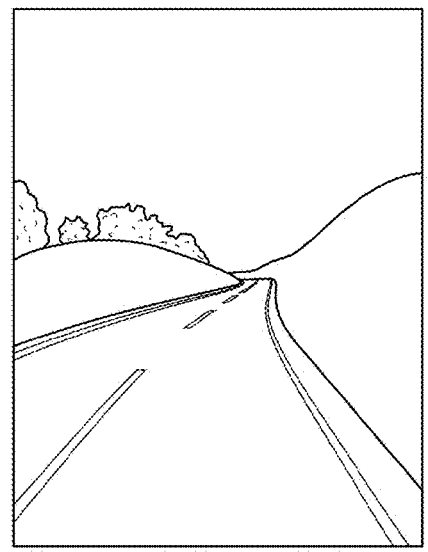

FIG. 3

| ROUTE NAME | XXXXX | |
|---|---|---|
| MEASUREMENT DATE | APRIL 29, 2015 | |
| WEATHER | CLEAR | |

| SECTION NUMBER | DISTANCE MARK | | | START POINT | | END POINT | | ATTRIBUTE | NECESSITY OF PROCESSING (NECESSITY: 1, NEEDLESSNESS: 0) |
|---|---|---|---|---|---|---|---|---|---|
| | START POINT (m) | | END POINT (m) | LATITUDE | LONGITUDE | LATITUDE | LONGITUDE | | |
| 1 | 0 | ~ | 100 | | | | | ROAD | 1 |
| 2 | 100 | ~ | 200 | | | | | ROAD | 1 |
| 3 | 200 | ~ | 220 | | | | | ROAD | 1 |
| 4 | 220 | ~ | 320 | | | | | BRIDGE | 0 |
| 5 | 320 | ~ | 400 | | | | | ROAD | 1 |
| 6 | 400 | ~ | 430 | | | | | ROAD | 1 |
| 7 | 430 | ~ | 580 | | | | | TUNNEL | 0 |
| 8 | 580 | ~ | 600 | | | | | ROAD | 1 |
| ... | ... | ~ | ... | | | | | ... | ... |

FIG. 7

| ROUTE NAME | ××××× | | JURISDICTION | ○○ CITY | | LANE WIDTH (m) (UP AND DOWN LANES) | | | 10 m | ROUTE EXTENSION (m) | |
|---|---|---|---|---|---|---|---|---|---|---|---|
| INSPECTION METHOD | AUTOMATIC INSPECTION USING ON-BOARD CAMERA | | AVERAGE CRACK (%) | 9 % | | AVERAGE RUTTED DEPTH (mm) 4 mm | | | AVERAGE LONGITUDINAL-SECTIONAL UNEVENNESS (IRI) (mm/m) | | |

| SECTION | | FACILITY, etc. | POSITION INFORMATION (WORLD GEODETIC SYSTEM) | | | | SECTION DISTANCE (m) | INSPECTION TIME | CRACK (%) | RUTTED DEPTH (mm) | LONGITUDINAL-SECTIONAL UNEVENNESS (IRI) (mm/m) | NUMBER OF PATCHES (LOCATION) | TRAFFIC (VEHICLES/DAY) |
|---|---|---|---|---|---|---|---|---|---|---|---|---|---|
| START POINT ~ END POINT | POSITION NAME | | START POINT (REPRESENTATIVE POINT) | | END POINT | | | | | | | | |
| | | | LATITUDE | LONGITUDE | LATITUDE | LONGITUDE | | | | | | | |
| 0 | 100 | | 35° 40' 50" | 139° 28' 19" | 35° 40' 51" | 139° 28' 19" | 100 | 2014/10 | 10 | 10 | | | |
| 100 | 200 | | 35° 40' 51" | 139° 28' 19" | 35° 40' 52" | 139° 28' 19" | 100 | 2014/10 | 0 | 5 | | | |
| 200 | 300 | | 35° 40' 52" | 139° 28' 19" | 35° 40' 53" | 139° 28' 19" | 100 | 2014/10 | 0 | 5 | | | |
| 300 | 400 | | 35° 40' 53" | 139° 28' 19" | 35° 40' 54" | 139° 28' 19" | 100 | 2014/10 | 30 | 20 | | | |
| 400 | 500 | | 35° 40' 54" | 139° 28' 19" | 35° 40' 55" | 139° 28' 19" | 100 | 2014/10 | 10 | 10 | | | |
| 500 | 600 | | 35° 40' 55" | 139° 28' 19" | 35° 40' 56" | 139° 28' 19" | 100 | 2014/10 | 0 | 5 | | | |
| 600 | 700 | | 35° 40' 56" | 139° 28' 19" | 35° 40' 57" | 139° 28' 19" | 100 | 2014/10 | 0 | 5 | | | |
| ... | ... | | ... | ... | ... | ... | ... | ... | ... | ... | | | |

FIG. 12
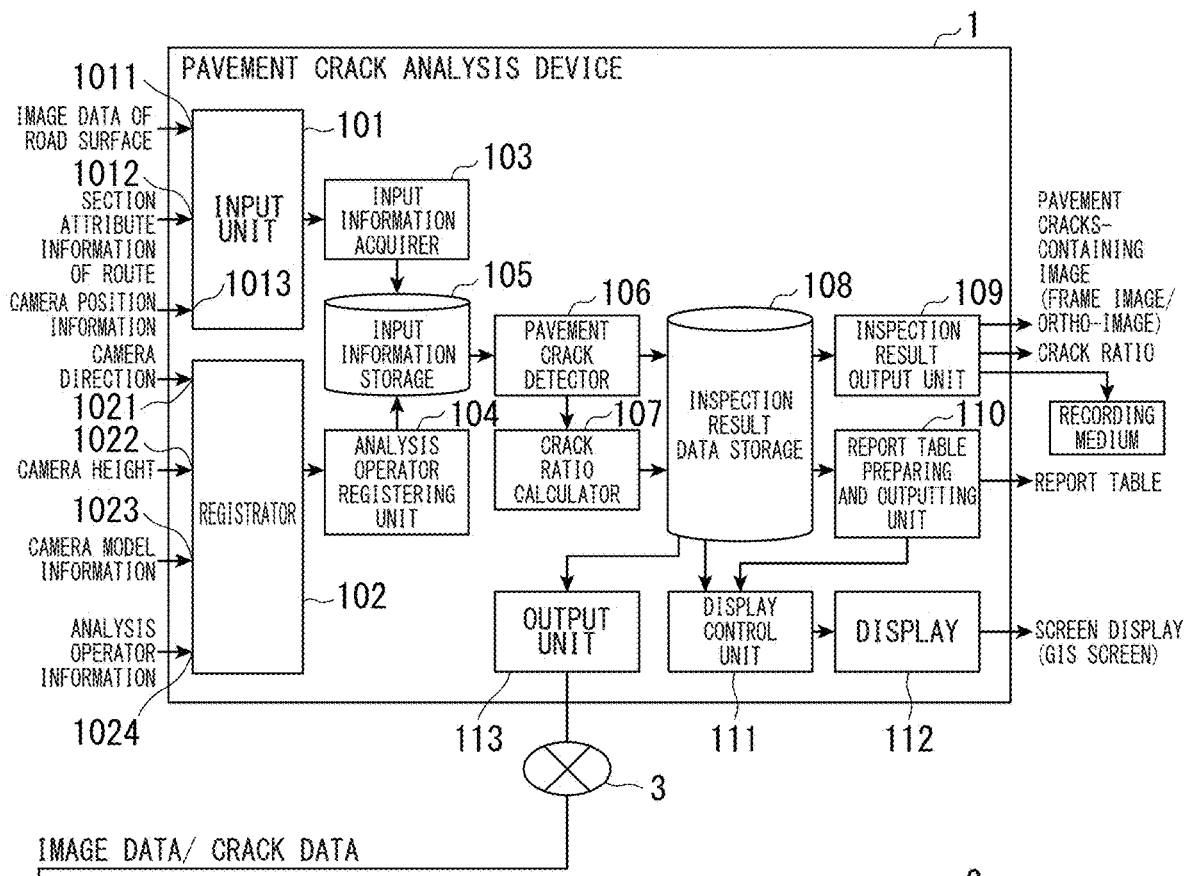
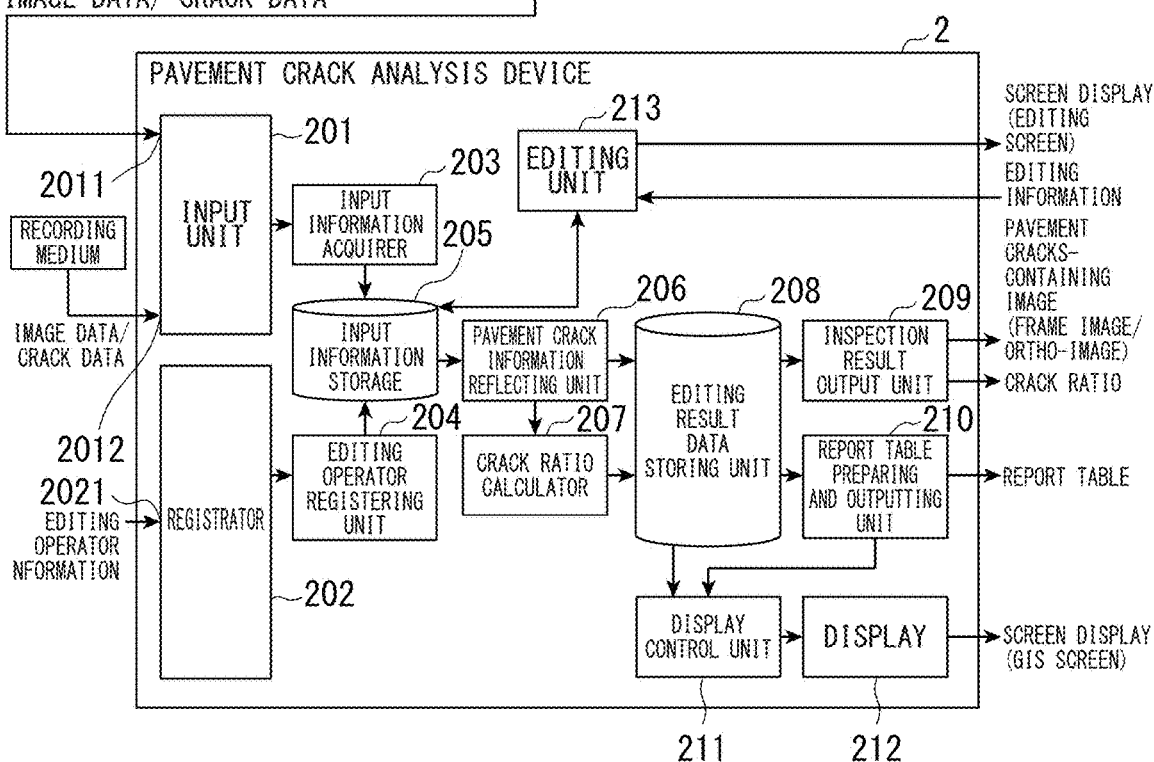

FIG. 14

| | | | 212 |
|---|---|---|---|

CRACK EDITING TOP SCREEN

| ROUTE NAME | 8035 |
|---|---|
| MEASUREMENT DATE | APRIL 29, 2015 |
| WEATHER | CLEAR |

2121

| SECTION NUMBER | SECTION | EDITING STATUS | EDITING DATE AND TIME | EDITER |
|---|---|---|---|---|
| 1 | 0m~100m | COMPLETION | NOVEMBER 1, 2015 | ○○○○ |
| 2 | 100m~200m | INCOMPLETION | | |
| 3 | 200m~300m | INCOMPLETION | | |
| 4 | 300m~400m | COMPLETION | NOVEMBER 2, 2015 | □□□□ |
| 5 | 400m~500m | INCOMPLETION | | |
| 6 | 500m~600m | INCOMPLETION | | |
| 7 | 600m~700m | COMPLETION | NOVEMBER 3, 2015 | □□□□ |
| 8 | 700m~800m | INCOMPLETION | | |
| 9 | 800m~900m | INCOMPLETION | | |
| 10 | 900m~1000m | INCOMPLETION | | |

| ROUTE NAME | ××××× | | JURISDICTION | ○○ CITY | | LANE WIDTH (m) (UP AND DOWN LANES) | | 10 m | | ROUTE EXTENSION (m) | |
|---|---|---|---|---|---|---|---|---|---|---|---|
| INSPECTION METHOD | AUTOMATIC INSPECTION USING ON-BOARD CAMERA | | AVERAGE CRACK (%) | 9 % | | AVERAGE RUTTED DEPTH (mm) | 4 mm | | | AVERAGE LONGITUDINAL-SECTIONAL UNEVENNESS (IRI) (mm/m) | |

| SECTION | | FACILITY, etc. | POSITION INFORMATION (WORLD GEODETIC SYSTEM) | | | | SECTION DISTANCE (m) | INSPECTION TIME | CRACK (%) | RUTTED DEPTH (mm) | LONGITUDINAL-SECTIONAL UNEVENNESS (IRI) (mm/m) | NUMBER OF HATCHED SQUARES (LOCATION) | TRAFFIC (VEHICLES /DAY) |
|---|---|---|---|---|---|---|---|---|---|---|---|---|---|
| START POINT | END POINT | POSITION NAME | START POINT (REPRESENTATIVE POINT) | | END POINT | | | | | | | | |
| | | | LATITUDE | LONGITUDE | LATITUDE | LONGITUDE | | | | | | | |
| 0 | 100 | | 35° 40' 50" | 139° 28' 19" | 35° 40' 51" | 139° 28' 19" | 100 | 2014/10 | 10※ | 10 | | | |
| 100 | 200 | | 35° 40' 51" | 139° 28' 19" | 35° 40' 52" | 139° 28' 19" | 100 | 2014/10 | 0 | 5 | | | |
| 200 | 300 | | 35° 40' 52" | 139° 28' 19" | 35° 40' 53" | 139° 28' 19" | 100 | 2014/10 | 0 | 5 | | | |
| 300 | 400 | | 35° 40' 53" | 139° 28' 19" | 35° 40' 54" | 139° 28' 19" | 100 | 2014/10 | 30※ | 20 | | | |
| 400 | 500 | | 35° 40' 54" | 139° 28' 19" | 35° 40' 55" | 139° 28' 19" | 100 | 2014/10 | 10 | 10 | | | |
| 500 | 600 | | 35° 40' 55" | 139° 28' 19" | 35° 40' 56" | 139° 28' 19" | 100 | 2014/10 | 0 | 5 | | | |
| 600 | 700 | | 35° 40' 56" | 139° 28' 19" | 35° 40' 57" | 139° 28' 19" | 100 | 2014/10 | 0※ | 5 | | | |
| ... | ... | | | | | | ... | ... | ... | ... | | | |

(※:EDITING COMPLETION)

FIG. 21
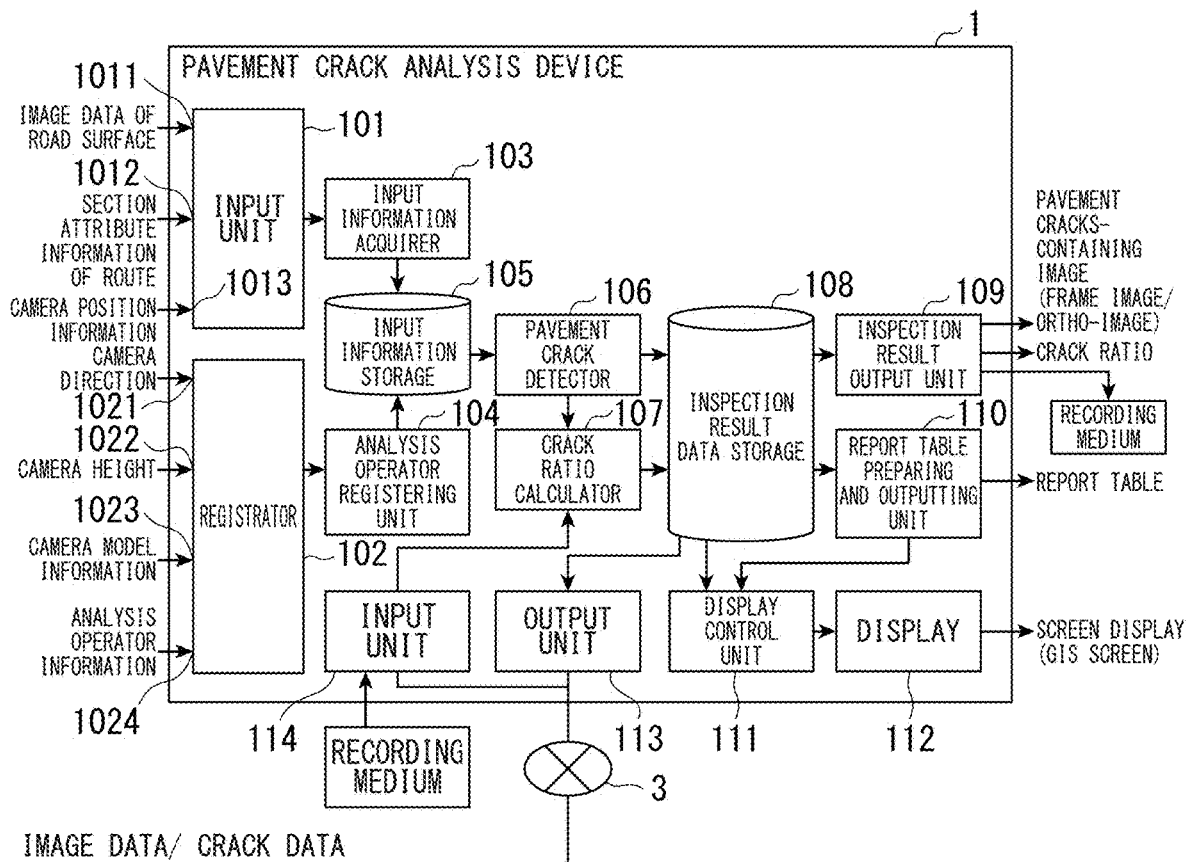
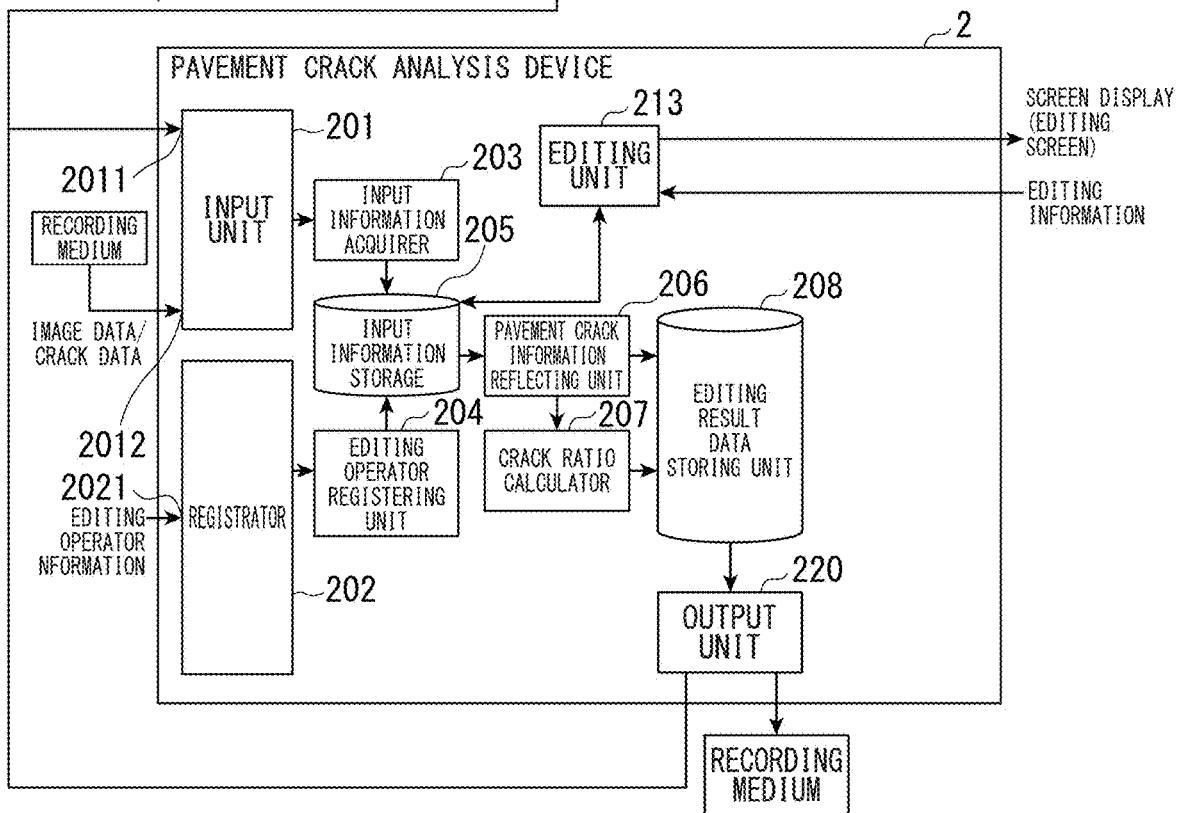

CRACK ANALYSIS DEVICE, CRACK ANALYSIS METHOD, AND CRACK ANALYSIS PROGRAM

CROSS-REFERENCE TO RELATED APPLICATION

The present application is a U.S. National Stage Application of International Application No. PCT/JP2016/071455 filed Jul. 21, 2016, which claims priority from Japanese Patent Application No. 2015-144224 filed on Jul. 21, 2015 and Japanese Patent Application No. 2015-234332 filed on Nov. 30, 2015, all of which are incorporated herein by reference in their entirety for all purposes.

TECHNICAL FIELD

Embodiments of the present invention relate to a crack analysis device, a crack analysis method, and a crack analysis program.

BACKGROUND ART

Conventionally, a road condition management method for managing road conditions by allowing a manager, who manages conditions of road signs and road conditions such as holes in roads and fallen objects, to view an image (a captured image) acquired by imaging a road with an on-board camera is known.

However, in the conventional road condition management method, an engineer who can determine cracks in a pavement performs human work of visually checking the number of cracks in a captured image and calculating a crack ratio in a pavement analyzing process including calculation of a "crack ratio" which is an important evaluation index (Handbook of Pavement Inspection/Examination Methods (Japan Road Association)) for road surface properties of an asphalt-paved road. Accordingly, an amount of captured images which needs to be visually checked in an analysis process of cracks on a route with a long distance may be enormous and it may be difficult to achieve improvement in efficiency of the crack analyzing process.

CITATION LIST

Patent Literature

[Patent Literature 1]
PCT International Publication No. 2011/108052
[Patent Literature 2]
Japanese Unexamined Patent Application, First Publication No. 2012-184624
[Patent Literature 3]
Japanese Unexamined Patent Application, First Publication No. 2008-015653
[Patent Literature 4]
Japanese Unexamined Patent Application, First Publication No. 2010-176705

SUMMARY OF INVENTION

Technical Problem

A technical problem of the invention is to provide a crack analysis device, a crack analysis method, and a crack analysis program that can achieve improvement in efficiency of a crack analyzing process.

Solution to Problem

A crack analysis device according to an embodiment includes a captured image acquiring unit, a crack detecting unit, and a crack ratio calculator. The captured image acquiring unit acquires a captured image which is obtained by imaging a road surface. The crack detecting unit detects cracks in the imaged road surface on the basis of the captured image. The crack ratio calculator calculates a crack ratio indicating a ratio of an area of the cracks to a predetermined area on the basis of the detected cracks.

BRIEF DESCRIPTION OF DRAWINGS

FIG. 1 is a diagram illustrating a schematic configuration of a pavement crack analysis device according to a first embodiment.

FIG. 3 is a diagram illustrating an example of section attribute information of a route according to the first embodiment.

FIG. 7 is a diagram illustrating an example of a report table which is output from the pavement crack analysis device according to the first embodiment.

FIG. 12 is a block diagram illustrating an example of a functional configuration of a pavement crack analysis system according to a second embodiment.

FIG. 14 is a diagram illustrating an example of an editing process which is performed by the pavement crack analysis device according to the second embodiment.

FIG. 16 is a diagram illustrating an example of a report table which is output from the pavement crack analysis device according to the second embodiment.

FIG. 21 is a block diagram illustrating another example of the functional configuration of the pavement crack analysis system according to the second embodiment.

DESCRIPTION OF EMBODIMENTS

Figure 2:
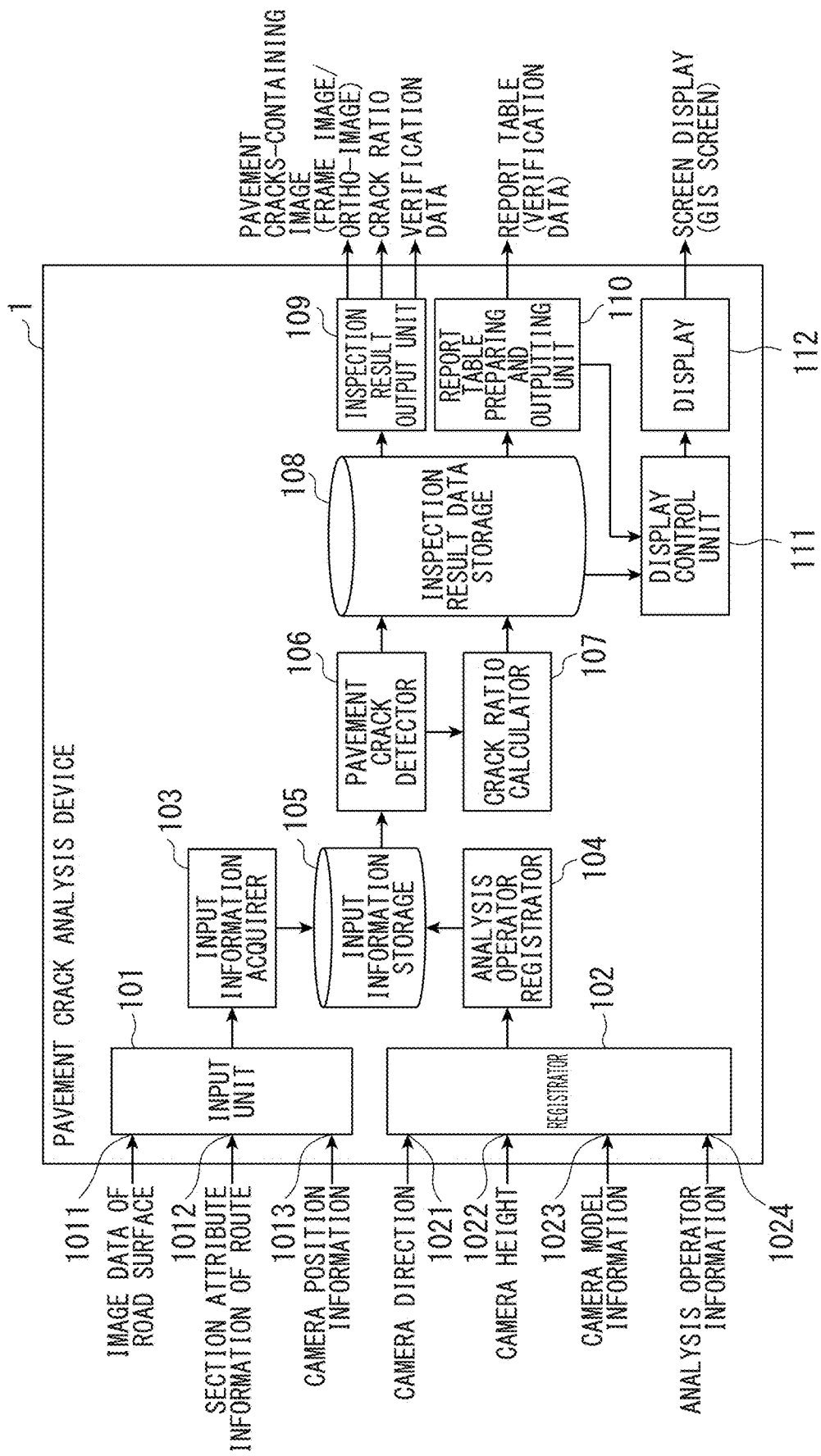
FIG. 2 is a block diagram illustrating an example of a configuration of the pavement crack analysis device according to the first embodiment.

Hereinafter, a crack analysis device and a crack analysis method according to embodiments will be described with reference to the accompanying drawings.

First, a pavement crack analysis device according to a first embodiment will be schematically described.

FIG. 1(A) schematically illustrates input information which is input to a pavement crack analysis device 1 and output information which is output from the pavement crack analysis device 1.

In the drawing, examples of input information include data of a captured image acquired by imaging a road surface with an on-board camera, section attribute information of a route of which the road surface is imaged, position information (position data) of the camera having acquired the captured image, information such as a direction of the on-board camera, a height of the on-board camera from the road surface, and a model of the on-board camera, and information of an analysis operator who performs analysis work. The pavement crack analysis device performs analysis using a crack analysis system on the basis of such input information and outputs, as output information, a pavement cracks-containing image (also referred to as a "cracks-superimposed image") in which an image indicating shapes of pavement cracks is included in the captured image, a crack ratio indicating an area ratio of pavement cracks on the road surface which is calculated on the basis of the captured image, verification data for verifying that the road surface from which a crack ratio is calculated is a correct inspection target, a report table indicating inspection results, a screen display, and the like. Details of the input information and the output information will be described later.

The input information input to the pavement crack analysis device 1 or the output information output from the pavement crack analysis device 1 is not limited to information illustrated in FIG. 1A, and may include, for example, setting information for acquiring the input information, processing information for performing processes such as calculating a crack ratio, setting information for changing display details of the screen display, and setting information for changing details of a report table to be output. The pavement crack analysis device 1 is illustrated as a single device in FIG. 1 and the like, but the pavement crack analysis device 1 may be a system including a plurality of devices.

An on-board camera and a road surface image captured with the on-board camera will be described below.

FIG. 1(B) is a diagram illustrating an example of an arrangement of the on-board camera and FIG. 1(C) is a diagram illustrating an example of a road surface image captured with the on-board camera.

In FIG. 1(B), an on-board camera 21 and a GPS receiver 22 are mounted on a roof of a vehicle 20. The on-board camera 21 is arranged to face a rear side in a traveling direction of the vehicle 20.

The on-board camera 21 is fixed with the direction of the camera such as an angle of depression with respect to a road surface, a height from the road surface, and an angle of deviation (a yawing angle in a horizontal direction) of an imaging direction with respect to the traveling direction of the vehicle 20 adjusted depending on a range of the road surface to be imaged. For example, in a case in which the vehicle images a road surface corresponding to one lane while traveling on one lane of a route with two lanes and a case in which the vehicle images a road surface corresponding to two lanes, it is necessary to change the direction of the camera (mainly the angle of deviation).

The GPS receiver 22 is disposed in the vicinity of the on-board camera 21 on the roof of the vehicle 20 and acquires position data from GPS satellites. The GPS receiver 22 may measure an azimuth or an acceleration. By measuring an azimuth or an acceleration, the traveling direction or the traveling speed of the vehicle 20 can be estimated. Accordingly, position data can be acquired, for example, even when radio waves from GPS satellites are not captured in a tunnel or a mountain area and position data cannot be acquired.

A light that irradiates a road surface and that is not illustrated may be mounted on the vehicle 20. Since shadows of trees or structures appear on a road surface due to solar light in the daytime, image processing for reducing an influence of shadows is required and detection accuracy of pavement cracks may be decreased by the image processing. By irradiating a road surface with the light, it is possible to enhance detection accuracy of cracks when imaging the road surface in the nighttime in which there is no influence of solar light. By irradiating a road surface with the light, it is possible to enhance detection accuracy of cracks by reducing an influence of shadows due to solar light in the daytime.

In FIG. 1(C), a road surface image captured with the on-board camera is acquired by adjusting the camera direction to face the road surface of one lane on which the vehicle is traveling. That is, in FIG. 1(C), when the vehicle travels at the center of one lane, the camera direction is adjusted such that a centerline appears at a left end of the drawing. The camera direction is adjusted such that a lane side line on the left side in the traveling direction of the vehicle appears at a right end of FIG. 1(C). By matching the camera direction with an imaging range, it is possible to acquire a captured image in a necessary and sufficient range of the road surface. FIG. 1(C) illustrates a background along with an image as if the road surface is overlooked from a side obliquely above. By imaging the background along with the road surface, an imaging position can be easily determined by concordance with the imaged background.

First Embodiment

A configuration of this embodiment will be described below.

FIG. 2 is a block diagram illustrating an example of a configuration of the pavement crack analysis device according to the first embodiment.

In FIG. 2, the pavement crack analysis device 1 includes an input unit 101, a registrator 102, an input information acquirer 103, an analysis operator registrator 104, an input information storage 105, a pavement crack detector 106, a crack ratio calculator 107, an inspection result data storage 108, an inspection result output unit 109, a report table preparing and outputting unit 110, a display control unit 111, and a display 112.

The input unit 101 includes a captured image acquiring unit 1011, a section attribute information input unit 1012, and a position data acquiring unit 1013.

The captured image acquiring unit 1011 acquires data of a captured image by imaging a road surface with the on-board camera 21. Connection between the captured image acquiring unit 1011 and the on-board camera 21 may be any one of wired connection and wireless connection. For example, the on-board camera may be connected to the captured image acquiring unit 1011 of the pavement crack analysis device 1 in a wired manner. The on-board camera may be connected to the captured image acquiring unit 1011 of the pavement crack analysis device 1 installed outside the vehicle via an on-board radio communication device in a wireless manner.

The data of a captured image acquired by the captured image acquiring unit 1011 may be data which is currently being captured with the on-board camera. The data of a captured image acquired by the captured image acquiring unit 1011 may be data of a captured image which has been captured and recorded with the on-board camera in the past.

The section attribute information input unit 1012 acquires section attribute information of a route of which the road surface is imaged. The section attribute information is information of attributes which are determined for each section of a route of which the road surface is imaged. The information of attributes is information such as "road," "bridge," and "tunnel." The section attribute information may include information such as a route name, a section number, a start point of a section, and an end point of a section. Details of the section attribute information of a route will be described later with reference to FIG. 3. Each route is divided into sections corresponding to distances from the start point and attributes of a section (section attributes) are determined for each section. The section attribute information is acquired from the section attribute information input unit 1012 in advance. The section attribute information of a route can be prepared using a PC or the like which is not illustrated. The section attribute information input unit 1012 may acquire the prepared section attribute information from the connected PC or the like via a network or may acquire the prepared section attribute information via a recording medium. The acquired section attribute information is used for a process of collecting captured images acquired from the captured image acquiring unit 1011. Details of the collecting process based on the section attribute information will be described later with reference to FIG. 7 or the like. In this embodiment, a case in which the section attribute information can be acquired is exemplified, but in a case in which the section attribute information cannot be acquired, analysis may be performed with the start of image data as a start point of a route, with the end of image data as an end point, and with the whole route as one section. Instead of performing the analysis process on the basis of the section attribute information, the analysis process may be performed at equal intervals such as intervals of 100 m.

The position data acquiring unit 1013 acquires position data of the camera which has taken the captured image acquired from the captured image acquiring unit 1011. The position data (position information) is, for example, longitude and latitude information which is acquired from a user receiver (a GPS receiver) of a global positioning system (GPS) mounted in the vehicle along with the camera. The position data may include information such as altitude, speed, and date and time in addition to the longitude and latitude information. The position data may be corrected using speed information or acceleration information of the vehicle having the camera mounted therein in a mountain area or a tunnel which is difficult for radio waves from the GPS satellites to reach.

The input unit 101 acquires data of the captured image acquired by the captured image acquiring unit 1011, the section attribute information of a route acquired by the section attribute information input unit 1012, and the position data acquired by the position data acquiring unit 1013 and outputs the acquired data to the input information acquirer 103.

The registrator 102 includes a camera direction input unit 1021, a camera height input unit 1022, a camera model information input unit 1023, and an analysis operator information input unit 1024.

The camera direction input unit 1021 acquires information of the direction of the on-board camera. The direction of the on-board camera includes an angle of depression of the camera with respect to the road surface and an angle of deviation of the imaging direction with respect to the traveling direction of the vehicle having the camera mounted therein. The camera height input unit 1022 acquires information of the height of the on-board camera from the road surface. An angle of depression refers to an angle which is formed by a sight line from the camera to a subject and a horizontal plane when imaging the subject below the horizontal plane with the same height as the camera. The angle of depression of the horizontal direction is 0°. The angle of depression of a direction from the camera to immediately below is 90°. The camera model information input unit 1023 acquires information such as camera model information. The information such as camera model information may include information such as a type of the camera, a focal length of a lens of the camera, and an image size to be captured. The analysis operator information input unit 1024 acquires information of an analysis operator who performs analysis work in the pavement crack analysis device 1. The information of an analysis operator includes, for example, a name and an identification (ID) of the analysis operator.

The registrator 102 acquires the information of a direction from the camera direction input unit 1021. The registrator 102 acquires the information of a height from the camera height input unit 1022. The registrator 102 acquires the camera model information from the camera model information input unit 1023. The registrator 102 acquires the information of an analysis operator from the analysis operator information input unit 1024. The registrator 102 registers registration information such as the acquired information of a direction, the acquired information of a height, the acquired camera model information, or the acquired information of an analysis operator in the analysis operator registrator 104.

The input information acquirer 103 determines whether the input unit 101 has acquired input information. When the input unit 101 has acquired the input information, the input information acquirer 103 stores the input information acquired from the input unit 101 in the input information storage 105.

The analysis operator registrator 104 determines whether the registrator 102 has acquired registration information. When the registrator 102 has acquired registration information, the analysis operator registrator 104 stores the acquired registration information in the input information storage 105.

In this embodiment, the input unit 101 and the registrator 102 separately acquire information, but the input unit 101 and the registrator 102 may be mounted as a single function.

The input information storage 105 stores the input information acquired by the input information acquirer 103 and the registration information acquired by the analysis operator registrator 104. For example, a storage device such as a hard disk drive can be used for the input information storage 105. The input information storage 105 stores data of the captured image acquired by the input information acquirer 103 in correlation with the position data acquired by the position data acquiring unit 1013. That is, the input information storage 105 stores the data of the captured image acquired by the captured image acquiring unit 1011 in correlation with the position data at the time of imaging. The position data may be recorded, for example, as an imaging condition in a still image file format of the captured image. When the acquired captured image is a moving image, the moving image may be converted into a plurality of still images and the position data may be recorded in the still image file format of each converted still image. Conversion of the captured image from a moving image to a still image may be performed, for example, by the input information acquirer 103. When a moving image is converted into still images, so-called time lapse of generating one still image every several frames may be performed. Correlation of the position data may be performed on a moving image instead of a still image. When correlation of the position data is performed on a moving image, for example, the position data may be sequentially recorded in correlation with and in synchronization with a record of the moving image. By storing the position data in correlation with the captured image, it is possible to specify an imaging position of the acquired captured image. By specifying the imaging position of the acquired captured image, for example, captured images taken at different dates and times at the same imaging position can be easily compared with each other.

The position data acquired using the GPS or the like may include a measurement error. When a measurement error is included, a plurality of captured images have the same position data, but may have different actual imaging positions depending on the captured images. In order to compare a plurality of captured images taken at the same imaging position with each other, the captured images having the same actual imaging position may be extracted and compared among the captured images having substantially the same position data. The extracting of the captured images having the same actual imaging position can be performed, for example, on the basis of concordance with a structure installed on the road surface or a background included in the captured images. Examples of the structure installed on a road surface include a centerline, a lane side line, a white line of a pedestrian crossing or the like, a utility pole, a sign, and a guard rail. Examples of the background include buildings and trees imaged along with the road surface. In this embodiment, by providing a predetermined angle of depression in the on-board camera, the structures or background (such as structures) imaged along with the road surface are included in the captured image. By determining concordance with structures included in the captured images, the captured images having the same imaging position can be specified among a plurality of captured images. The position data of other captured images can be corrected on the basis of the position data of the captured images having the same imaging position. Correction of the position data may be performed using information such as acceleration and azimuth during traveling which are measured by the GPS receiver.

The imaging date and time at which a captured image is taken may be stored in correlation with the captured image. As described above, the imaging date and time can be stored as a part of the position data. By storing the imaging date and time in correlation with the captured image, a plurality of captured images taken at different dates and times at the same imaging position can be easily compared with the imaging date and time designated.

The pavement crack detector 106 detects pavement cracks in the captured images stored in the input information storage 105 and generates crack shape data. The pavement cracks are asphalt cracks formed on the surface of the pavement, and the crack shape data is data indicating shapes of cracks. As a data format of the crack shape data, any one of raster data in which shapes of cracks are expressed by an image and vector data in which shapes of cracks are expressed by numerical values may be used. A shape of cracks is expressed by a length of the crack, a position of the crack, a width of the crack, a depth of the crack, and the like.

A shape of cracks may include information indicating a direction of the crack. A direction of cracks refers to, for example, an angle with respect to the traveling direction of the vehicle. An angle with respect to the traveling direction of the vehicle may be expressed in a range of −90° to 90° with respect to the traveling direction of the vehicle as 0°. The direction of cracks may be expressed by linearly approximating cracks with a predetermined length. The shape of cracks may be a straight line shape, a curved line shape, a branch shape in which a plurality of straight lines or curved lines branch, or a shape constituting a polygonal shape by cracks (referred to as a "tortoise-shell shape" in this embodiment and not limited to a hexagonal shape).

The pavement crack detector 106 can evaluate pavement cracks in more detail by detecting the shape of the crack. In general, it can be said that deterioration progresses more in cracks of a tortoise-shell shape than in cracks of a straight line shape.

The crack shape data may express a shape of cracks using raster data. The crack shape data may express a shape of cracks in numerical values using vector data. The crack shape data may express shapes such as a width and a depth of cracks using line segments with different thicknesses or colors.

The pavement crack detector 106 can detect cracks in a pavement, for example, on the basis of luminance information of a road surface.

The pavement crack detector 106 includes an image generating unit that generates a cracks-superimposed image (a pavement cracks-containing image) in which the detected crack shape data is superimposed on the captured image acquired from the captured image acquiring unit 1011.

The pavement crack detector 106 outputs the detected crack shape data to the crack ratio calculator 107. For example, the pavement crack detector 106 uses vector data indicating a shape of cracks as the crack shape data output to the crack ratio calculator 107. By using vector data including a shape of cracks as coordinate data on a road surface, the crack ratio calculator 107 can easily count the number of cracks in a square range to be described later.

An ortho-image may be prepared by superimposing images prepared among a plurality of frame images. For example, the pavement crack detector 106 can generate an ortho-image with a wide dynamic range by generating and synthesizing ortho-images on the basis of a plurality of frame images captured with varying exposure. The pavement crack detector 106 may generate an ortho-image on the basis of a plurality of frame images having different imaging positions. By generating an ortho-image on the basis of a plurality of frame images having different imaging positions, it is possible to generate an ortho-image on the basis of the frame images which have been successfully taken, for example, even when imaging trouble such as fluctuation has occurred in frame images due to vibration or the like in the vehicle.

The pavement crack detector 106 stores the detected crack shape data and the generated cracks-superimposed image in the inspection result data storage 108. The cracks-superimposed image stored in the inspection result data storage 108 may be compressed in an amount of data using a predetermined compression method.

The crack ratio calculator 107 calculates a crack ratio on the basis of the crack shape data acquired from the pavement crack detector 106. The crack ratio calculator 107 stores the calculated crack ratio in the inspection result data storage 108.

The crack ratio is obtained by considering squares (mesh squares) with one side of 0.5 m on a road surface viewed from immediately above and calculating an area of pavement cracks on the basis of the number of cracks present in one square. For example, the crack ratio may be calculated to be $0.25 \text{ m}^2$ (100%) when two or more cracks are present in a square. Similarly, the crack ratio may be calculated to be $0.15 \text{ m}^2$ (60%) when one crack is present in a square, and the crack ratio may be calculated to be $0 \text{ m}^2$ (0%) when no cracks are present in a square. That is, the crack ratio is expressed by the following equation.

Crack ratio (%)=100×(area of cracks)/(area of inspection section)

In this embodiment, it is assumed that the squares are set on the basis of the position data which is acquired from the position data acquiring unit 1013 by the crack ratio calculator 107. The area of an inspection section may be, for example, one square ($0.25 \text{ m}^2$) or an area of a road surface within a predetermined road distance (for example, 13 m, 100 m, or a distance over all sections in a route). In this embodiment, the area of an inspection will be described later with reference to a case in which the crack ratio is calculated to be an average value for each square or for each section of a route (12.5 m or 100 m).

The crack ratio calculator 107 stores the calculated crack ratio in the inspection result data storage 108. The crack ratio calculator 107 stores the number of cracks for each square which is used for calculating the crack ratio along with the position data of the square in the inspection result data storage 108.

The inspection result output unit 109 outputs the cracks-superimposed image stored in the inspection result data storage 108 to an external device of the pavement crack analysis device 1. The external device is, for example, a storage device that stores data in another computer system which is not illustrated or a recording medium. The inspection result output unit 109 outputs the cracks-superimposed image as a frame image or an ortho-image to the external device outside the pavement crack analysis device.

A frame image is an image for each frame of a captured image when a road surface is viewed obliquely. A captured image of a road surface in this embodiment is acquired by imaging the rear side of the vehicle with the on-board camera. An ortho-image is an image when a road surface is viewed from immediately above and is acquired by converting a frame image as a source image. The frame image is used as a source image serving as an ortho-image when a road surface is viewed from immediately above. Since a frame image includes a predetermined range on the basis of an imaging angle of the on-board camera, the frame image can be used to specify an imaging position using the background or a structure on a road included in the frame image. On the basis of the fact that the frame image is suitable for specifying an imaging position, the frame image can be used as verification data for verifying that the road surface of which the crack ratio is calculated is a correct inspection target.

A frame image of a cracks-superimposed image is obtained by superimposing crack shape data on a frame image. By superimposing crack shape data on a frame image, correspondence between an imaging position and a pavement crack state can be easily visually recognized. A cracks-superimposed image may be used as the verification data, instead of or in addition to a frame image.

An ortho-image of a cracks-superimposed image is obtained by superimposing crack shape data on an ortho-image of a captured image when a road surface is viewed from immediately above for each frame. The cracks-superimposed image can be generated by superimposing the crack shape data on an ortho-image of a still image generated by capturing video data for each frame or every several frames. The inspection result output unit 109 can reproduce the cracks-superimposed image like a moving image by continuously outputting the cracks-superimposed image of a still image.

The crack shape data is vector data or raster data indicating a shape of a crack. The crack shape data may be expressed by a line segment which is drawn with a predetermined color and which has a predetermined thickness to be easily visually recognized. The crack shape data may be subjected to correction (editing) such as adding, deleting, or changing the crack shape data using an editing function which will be described later.

The inspection result output unit 109 outputs crack data stored in the inspection result data storage 108 to an external device outside the pavement crack analysis device 1 similarly to the inspection result output unit 109. The inspection result output unit 109 outputs the crack data in correlation with the cracks-superimposed image. By outputting the cracks-superimposed image in correlation with the crack data, for example, another computer system can display the crack data and the cracks-superimposed image in correlation with each other. Display of the cracks-superimposed image and the crack data in correlation with each other is, for example, display in which the crack data is superimposed on the cracks-superimposed image or display in which the cracks-superimposed image and the crack data are arranged in parallel.

The inspection result output unit 109 outputs the crack ratio calculated by the crack ratio calculator 107 and stored in the inspection result data storage 108. The inspection result output unit 109 outputs, for example, the crack ratio for each square and the crack ratio (an average value) calculated for each section of a route. The inspection result output unit 109 may output data of the crack ratios before they are averaged and a maximum value of the crack ratios within a predetermined section instead of the average value of the crack ratios for each section of a route. The inspection result output unit 109 may output the crack ratio of the corresponding section along with the cracks-superimposed image.

The inspection result output unit 109 outputs verification data. Verification data is data for verifying that the road surface of which the crack ratio is calculated is a correct inspection target. For example, when a start point and an end point of a route are designated and the road surface from the start point to the end point is an inspection target, the verification data is data for verifying later that pavement cracks in the whole road surface from the start point to the end point have been inspected. For example, all the captured images (frame images or ortho-images) can be used as the verification data.

The time at which output information such as a cracks-superimposed image, a crack ratio, or verification data is output from the inspection result output unit 109 is arbitrary, and the inspection result output unit 109 may output the output information, for example, when data such as a cracks-superimposed image of a predetermined section is stored in the inspection result data storage 108. The inspection result output unit 109 may output the output information on the basis of a user's explicit operation.

The report table preparing and outputting unit 110 prepares a predetermined report table on the basis of the crack data stored in the inspection result data storage 108 and outputs the report table to the outside of the pavement crack analysis device 1 or the display control unit 111. Details of the predetermined report table will be described later with reference to FIGS. 7 and 8. The report table preparing and outputting unit 110 may prepare a predetermined report table including the cracks-superimposed image along with the crack data. By including the cracks-superimposed image in the report table, it is possible to express road surface properties in more detail. The report table preparing and outputting unit 110 outputs the prepared report table as image data, but may output the prepared report table as a document file in a predetermined file format. The report table preparing and outputting unit 110 outputs the prepared report table to the display control unit 111.

The report table preparing and outputting unit 110 can include the verification data in the report table to be output. By outputting the verification data as the report table, it is possible to verify the inspection result of the output report table. The verification data may be used as billing data when a pavement crack detection service is provided using the pavement crack analysis device 1. For example, the verification data is used as billing data by automatically calculating a fee by multiplying a cumulative value of inter-frame distances or the number of frame images by a predetermined unit price. When billing is performed on the basis of the verification data, details of billing for the service can be easily understood.

The display control unit 111 generates display screen data on the basis of the inspection results such as the cracks-superimposed image and the crack ratio and outputs the generated display screen data to the display 112. The display control unit 111 generates, for example, screen data including the cracks-superimposed images stored in the inspection result data storage 108 as a display image.

The display control unit 111 generates screen data which can be used to compare a plurality of cracks-superimposed images having different imaging dates and times from the plurality of cracks-superimposed images having different imaging dates and times. The plurality of cracks-superimposed images to be compared have substantially the same position data and are generated on the basis of captured images taken from the same imaging position (which may include some error). The screen data may include data (GIS screen data) using a geographic information system (GIS).

The display 112 displays the screen data input from the display control unit 111 on a screen. The display 112 is, for example, a liquid crystal display device. The screen data to be displayed may include, for example, map information which will be described later with reference to FIG. 9.

Details of the section attribute information of a route which is acquired from the section attribute information input unit 1012 described above with reference to FIG. 1 will be described below.

FIG. 3 illustrates a screen of an information input device such as a PC when section attribute information of a route is input.

In FIG. 3, section attribute information of a route includes "route name," "measurement date," "weather," "section number," "distance mark," "longitude" and "latitude" of a "start point," "longitude" and "latitude" of an "end point," "attributes," and "necessity of processing."

The "route name" is a name given to a road. The "measurement date" is a date on which a road surface image is captured. The "weather" is weather when the road surface image is captured. The "section number" is a number of each section obtained by dividing the route into predetermined sections. The "distance mark" illustrates distances to a start point and an end point of each section from a start point (0 m) of the route. The "longitude" and "latitude" of a "start point" and the "longitude" and "latitude" of an "end point" are longitude and latitude information of the start point and the end point. The "attributes" indicate attributes of each section (section attributes). The attributes include "road," "bridge," and "tunnel." When the attributes are different, necessary inspection entries or methods of reporting inspection results may be different. A section in this embodiment is defined by dividing a route by a predetermined distance. For example, sections with section numbers 1 and 2 are sections defined by dividing a route every 100 m. Sections with the attributes of "bridge" or "tunnel" are different from sections with the attribute of "road." For example, a section with section number 4 has the attribute of "bridge," a start point of 220 m, and an end point of 320 m, and is different from sections with the attribute of "road" defined every 100 m from the start point 0 m in the dividing method. Similarly, a section with section number 7 has the attribute of "tunnel," a start point of 430 m, and an end point of 580 m.

The "necessity of processing" is for setting necessity of a crack analyzing process for each section. It is assumed that the crack analyzing process is performed only on sections with the attribute of "road" in this embodiment. That is, the section attribute information of the route illustrated in FIG. 3 represents that a crack ratio needs to be calculated for each section with the attribute of "road" such as sections with section numbers 1, 2, 3, 5, 6, and 8. The crack ratio of each section can be calculated as an average value in the distance between the start point and the end point shown in the distance mark.

Figure 20:
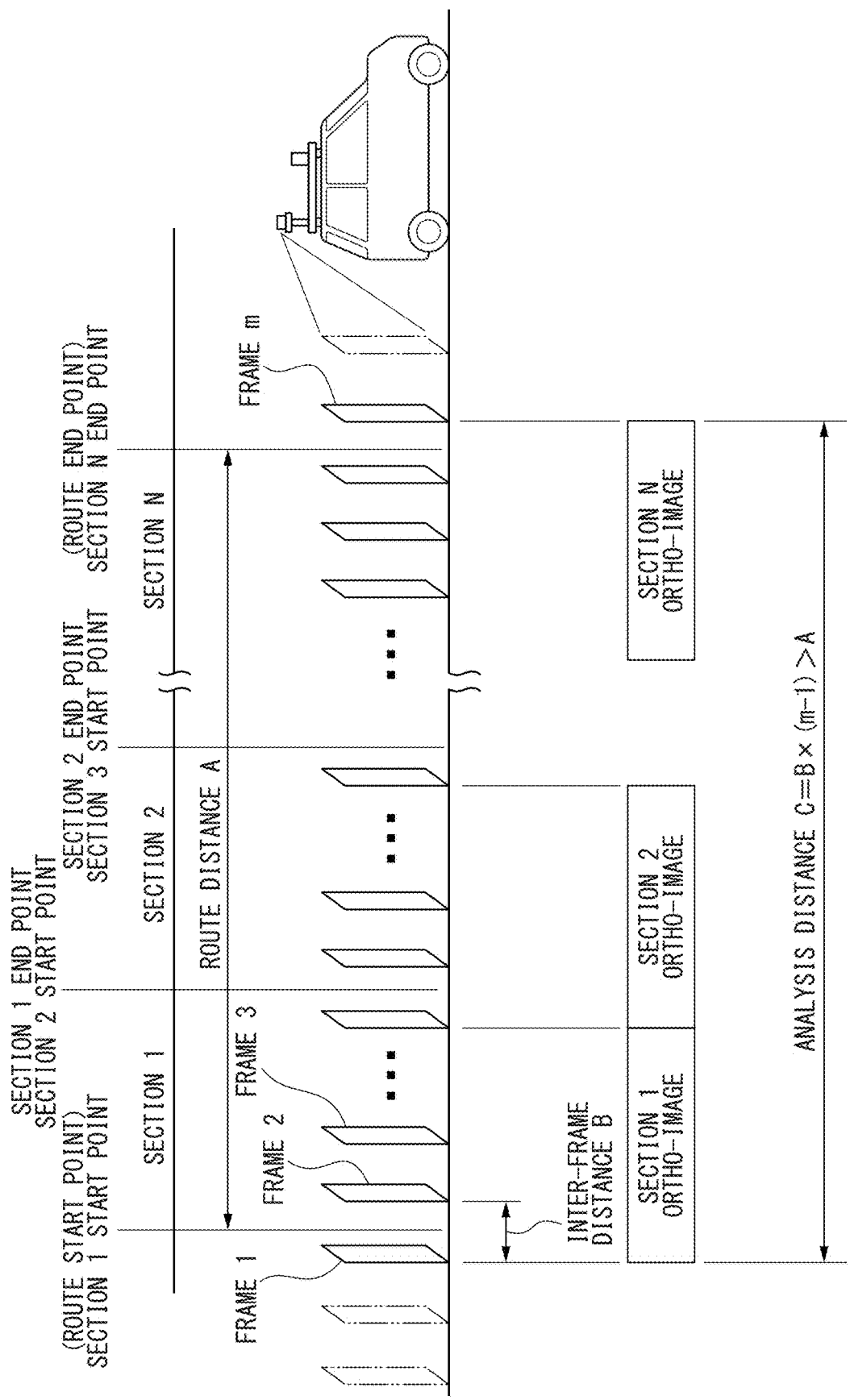
FIG. 20 is a diagram illustrating a relationship between sections of a route and frame images captured at inter-frame distances according to the embodiments.

A relationship between route sections and frame images captured at the inter-frame distances, which has been described in FIG. 1, will be described below. FIG. 20 is a diagram illustrating a relationship between route sections in this embodiment and frame images captured at the inter-frame distances.

In FIG. 20, it is assumed that an analysis target of a road surface is sections with a route distance A between a start point of a route and an end point of the route. That is, verification data needs to verify that analysis is correctly performed on a road surface with the route distance A including the start point of the route and the end point of the route. The route distance A is divided into continuous sections from Section 1 to Section N. Section 1 is a section from a Section 1 start point to a Section 1 end point. The Section 1 end point is a Section 2 start point.

A vehicle traveling while imaging the rear side with an on-board camera travels from before the start point of the route to after the end point of the route. The on-board camera mounted in the vehicle captures a frame image every inter-frame distance B. Rhombic marks illustrated in FIG. 20 indicate the captured frame images. The solid frame images indicate frame images which are converted into ortho-images from which a crack ratio will be calculated. The dotted frame images indicate frame images from which a crack ratio is not calculated. The frame images which are converted into ortho-images from which a crack ratio is calculated are m frame images of Frame 1 to Frame m.

When the route distance A including a start point and an end point of an analysis target is to be analyzed, ortho-images from which a crack ratio is calculated need to include at least the start point of the route and include at least the end point of the route. In this embodiment, analysis can be performed for all parts of the route distance A by starting acquisition of the frame images including the start point of the route from before the start point of the route and continuing to acquire the frame images including the end point of the route to after the end point of the route. For example, the ortho-image of Section 1 includes Frame 1 before the start point of the route. The ortho-image of Section N includes Frame m after the end point of the route. For example, in Section 2 which is a section between Section 1 and Section N, the ortho-image of Section 2 includes the frame images in Section 2. Accordingly, the frame images which are converted into ortho-images in Section 1 and Section N number one more than the frame images which are converted into ortho-images in the sections therebetween. By acquiring the frame images in this way, it is possible to analyze all parts of the route which is an analysis target.

When an analysis distance using the ortho-images is defined as C, the analysis distance C is a cumulative value of the inter-frame distances B. The inter-frame distances B may be constant or may not be constant. When the analysis distance C is greater than the route distance A, it can be represented that cracks of the road surface are analyzed at least in sections which are longer than the route distance A. That is, the cumulative value C of the inter-frame distances into which the inter-frame distances B are accumulated can be used as verification data. When the inter-frame distances are constant, the number of frame images can be used as the verification data.

In this embodiment, an example in which a road is divided every 100 m and a section close to a bridge or a tunnel is shorter than 100 m has been described above. However, the method of setting sections is not particularly limited, and for example, a distance (a distance from the start point to the end point) 20 m of the section with Section number 3 in FIG. 3 may be taken into the section with Section number 2 and the distance of the section with Section number 2 may be set to 120 m. The road may be divided every 50 m instead of 100 m. A bridge or a tunnel may be set as a crack analysis target.

All images (frame images or ortho-images) captured as described above can be used as the verification data, but all the captured images increase an amount of data and make it difficult to handle the data. Therefore, in this embodiment, a case in which simple verification is possible using the following two types of data as the verification data will be described as another example.

<Cumulative Value of Inter-Frame Distances is Used as Verification Data>

An inter-frame distance is a length in a range direction after one frame image is captured and until a next frame image is captured. Since a background or the like appears in a frame image, it can be easily checked that frame images captured every inter-frame distance have been taken in continuous sections. A frame image is converted into an ortho-image and is used to calculate a crack ratio or the like. Accordingly, by determining a predetermined inter-frame distance and capturing and recording a frame image every inter-frame distance, it can be checked that a crack ratio of a road surface included in the frame images is calculated. By recording a cumulative value in which the inter-frame distances are accumulated and comparing the cumulative value with distances from a start point to an end point, it is possible to simply verify that the road surface of which the crack ratio is calculated at the distances from the start point to the end point is a correct inspection target.

<Number of Frame Images Captured at Inter-Frame Distances is Used as Verification Data>

By determining a predetermined inter-frame distance and recording the number of frame images captured instead of capturing a frame image every inter-frame distance, calculating a crack ratio, and recording the cumulative value of the inter-frame distances, it is possible to compare the number of frame images to be captured at a distance from a start point to an end point with the number of frame images actually captured. By using the number of frame images captured at the inter-frame distances as verification data, it is possible to simply verify that the road surface of which a crack ratio is calculated is a correct inspection target.

An operation routine of the pavement crack analysis device according to the first embodiment will be described below.

Figure 4:
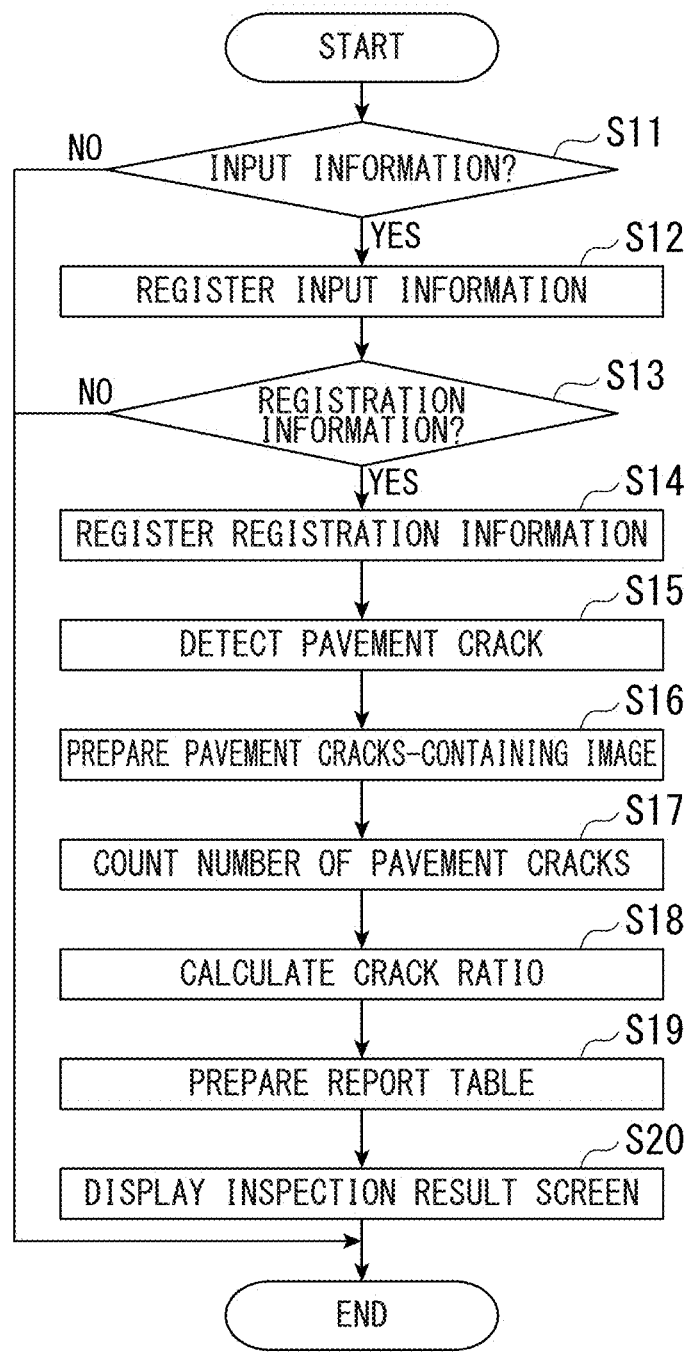
FIG. 4 is a flowchart illustrating an example of operations of the pavement crack analysis device according to the first embodiment.

FIG. 4 is a flowchart illustrating an example of an operation routine of the pavement crack analysis device according to the first embodiment.

In FIG. 4, the input information acquirer 103 determines whether there is input information input from the input unit 101 (Step S11). The input information includes, for example, data of captured images acquired from the captured image acquiring unit 1011, section attribute information of a route acquired from the section attribute information input unit 1012, and position data acquired from the position data acquiring unit 1013.

When it is determined there is no input information (NO in Step S11), the routine illustrated in the flowchart of FIG. 4 is ended (end). The ended routine is restarted (start) and the process of Step S11 is performed.

On the other hand, when it is determined that there is input information (YES in Step S11), the input information acquirer 103 registers (stores) the input information in the input information storage 105 (Step S12).

After the process of Step S12 is performed, the analysis operator registrator 104 determines whether there is registration information input from the registrator 102 (Step S13). The registration information includes, for example, information of a direction acquired from the camera direction input unit 1021, information of a height acquired from the camera height input unit 1022, and camera model information acquired from the camera model information input unit 1023.

When it is determined that there is no registration information (NO in Step S13), the routine illustrated in the flowchart of FIG. 4 is ended (end). The ended routine is restarted (start) and the process of Step S13 is performed.

On the other hand, when it is determined that there is registration information (YES in Step S13), the analysis operator registrator 104 registers (stores) the registration information in the input information storage 105 (Step S14).

After the process of Step S14 is performed, the pavement crack detector 106 detects pavement cracks on the basis of data of captured images input from the captured image acquiring unit 1011 and stored in the input information storage 105 (Step S15). The pavement crack detector 106 can determine that a part having a large variation in luminance is pavement cracks by performing a differentiating process on luminance information of the captured images. For example, a shadow of a tree has a small variation in luminance and thus is not determined to be a pavement crack. The pavement crack detector 106 can determine a pavement crack depending on whether a shape of the differentiated luminance information is a crack shape with a predetermined length. For example, stains on a road surface, fallen objects such as fallen leaves, and shadows of structures such as electric cables can be determined not to be cracks on the basis of the shapes thereof.

The pavement crack detector 106 may change setting of a processing method of detecting a pavement crack, parameters, and the like depending on a state of a road surface. For example, as described above, since shadows in a captured image affect detection of a crack, the pavement crack detector 106 may acquire information such as weather or illuminance when the road surface is imaged and may perform a process based on the acquired information. For example, clear weather, cloudy weather, rainy weather, or the like can be set as the weather. When the weather is clear weather, a likelihood that a shadow will be formed due to a tree or the like increases. When the weather is cloudy weather, contrast of unevenness of a road surface may decrease. When the weather is rainy weather, a road surface is likely to reflect light and thus it may be difficult to detect the shape of the road surface due to reflection of light. It may be difficult to detect pavement cracks depending on presence of fallen snow on a road surface, fallen objects such as fallen leaves, or sedimentary sand and soil. The pavement crack detector 106 may change settings of a processing method of detecting a pavement crack, parameters, and the like depending on whether there is fallen snow on the road surface or the like.

Changing of settings of a processing method, parameters, and the like depending on a road surface state by the pavement cracks detecting unit 106 may be automatically performed from a captured image. The changing of settings depending on a road surface state by the pavement crack detector 106 may be performed in response to a user's settings. The settings of the pavement crack detector 106 may be acquired, for example, from the registrator 102 and stored in the input information storage 105 and may be used by the pavement crack detector 106.

The pavement crack detector 106 performs orthographic conversion on a captured image before outputting the crack shape data to the crack ratio calculator 107. Since the on-board camera is disposed with a predetermined angle of depression with respect to the road surface as described above, a captured image is an image when the road surface is viewed obliquely. The pavement crack detector 106 performs the orthographic conversion on the captured image to convert the captured image into an ortho-image in which the road surface is viewed from immediately above. The crack shape data output to the crack ratio calculator 107 indicates shape of a cracks when the road surface is viewed from immediately above. The pavement crack detector 106 outputs position data indicating a position at which the cracks are detected on the road surface along with the crack shape data to the crack ratio calculator 107. The position data output to the crack ratio calculator 107 can be calculated on the basis of the position data of the camera acquired from the position data acquiring unit 1013.

The pavement crack detector 106 can use all or some of the captured images as a conversion target when converting the captured images into ortho-images. For example, by performing orthographic conversion on a frame image (a still image) corresponding to one frame of the captured image acquired from the on-board camera, the pavement crack detector 106 can convert a whole frame image into an ortho-image.

The pavement crack detector 106 may sequentially convert parts having a large angle of depression in the frame images into ortho-images. Since the on-board camera images from the rear side of the vehicle at a predetermined viewing angle, an upper part of a captured image is an image obtained by imaging the road surface from a side close to the horizontal direction in which the angle of depression is small. On the other hand, a lower part of the captured image is an image obtained by imaging the road surface from a side close to immediately above in which the angle of depression is large. A part having a large angle of depression has a smaller distance from the on-board camera to the road surface than a part having a small angle of depression and thus a frame image thereof includes an image of the road surface with a higher resolution. The pavement crack detector 106 can generate continuous ortho-images by sequentially converting one square or several squares of the lower part (the near-side road surface in a captured image) having a large angle of depression in frame images which are continuously acquired into ortho-images and connecting the continuous ortho-images. Ortho-images including a clear image of pavement cracks can be generated by sequentially converting the part having a large angle of depression in the frame images into ortho-images.

The ortho-image conversion method may be adjusted depending on the processing capacity of the pavement crack detector 106, the performance of the on-board camera, the imaging conditions such as weather, a vehicle speed of the vehicle, and the like. For example, a preprocessing method such as adjustment of contrast or adjustment of brightness at the time of conversion of a frame image into an ortho-image, a range in a frame image which will be converted into an ortho-image, a resolution of the generated ortho-image, and the like may be adjusted depending on such conditions.

The pavement crack detector 106 prepares (generates) a cracks-superimposed image in which detected pavement cracks are superimposed on the capture image (Step S16). The pavement crack detector 106 expresses the shape of the cracks by a colored line segment in the crack shape data. The color of the line segment or the thickness of the line segment indicating the shape of cracks may be changed depending on the shape of cracks or according to settings. Since the crack shape data is vector data or raster data indicating the shape of a crack, the cracks-superimposed image may be a combination of a captured image and raster data indicating the shape of cracks or a combination of a captured image and vector data indicating the shape of a crack. The vector data indicating the shape of cracks can be converted into an image (rasterized) and superimposed on the captured image when the cracks-superimposed image is displayed.

An example in which the image generating unit that generates a cracks-superimposed image is included in the pavement crack detector 106 has been described above, but the image generating unit may be embodied by a functional unit other than the pavement crack detector 106.

In this embodiment, an example in which a cracks-superimposed image indicating cracks in a pavement (asphalt) is generated has been described above, but a cracks-superimposed image of another material such as concrete may be generated.

After the process of Step S16 is performed, the crack ratio calculator 107 counts the number of pavement cracks included in a mesh of 0.5 m on the basis of the pavement cracks detected by the pavement crack detector 106 (Step S17) and calculates a crack ratio (Step S18). As described above, the crack ratio is calculated to be 100% when there are two or more cracks in a square, 60% when there is one crack in a square, and 0% when there are no cracks in a square. The crack ratio calculator 107 stores the number of cracks and the crack ratio as crack data in the inspection result data storage 108.

The number of cracks for each square is stored in a data format that can be expressed in rows and columns such as data of a comma-separated values or character-separated values (CSV) format (CSV data). For example, when CSV data is used, one row or one column of the CSV data corresponds to the size of a square (mesh of 0.5 m) and thus position data of the squares is expressed by the number of rows or the number of columns of the CSV data. The crack ratio or the number of cracks may be expressed, for example, by a color code or an icon which is displayed on the display 112. In this embodiment, the crack ratio, the number of cracks, the color code expressing them, and the like are referred to as "crack data." It is assumed that the crack data includes a numerical value of the crack ratio or the number of cracks and a color code or a shape of a mark based on the crack ratio or the number of cracks. For example, "display crack data" includes a case in which the numerical value of the crack ratio or the number of cracks is displayed and a case in which a color or a mark based on the numerical value of the crack ratio or the number of cracks is displayed. The crack data is set for each square, but, for example, an average value of crack data of squares in a predetermined range may be referred to as crack data. In this embodiment, an example in which CSV data is used as a data format which can be expressed in rows and columns has been described, but the data format which can be expressed in rows and columns is not limited to the CSV data and may be, for example, a data format which is used for a spread sheet application.

After the process of Step S18 is performed, the report table preparing and outputting unit 110 prepares a report table (Step S19). The report table to be prepared may be selected from among a plurality of types by a user. Information which is input to the report table may be selected or corrected by a user.

After the process of Step S19 is performed, the display control unit 111 displays a screen indicating an inspection result on the display 112 (Step S20). The inspection result which is displayed on the display 112 is the report table which has been prepared in Step S19, for example, on the basis of the cracks-superimposed image, the crack ratio, or data thereof.

After the process of Step S20 is performed, the routine illustrated in the flowchart of FIG. 4 is ended.

An analysis process which is performed by the pavement crack analysis device according to the first embodiment will be described below.

Figure 5:
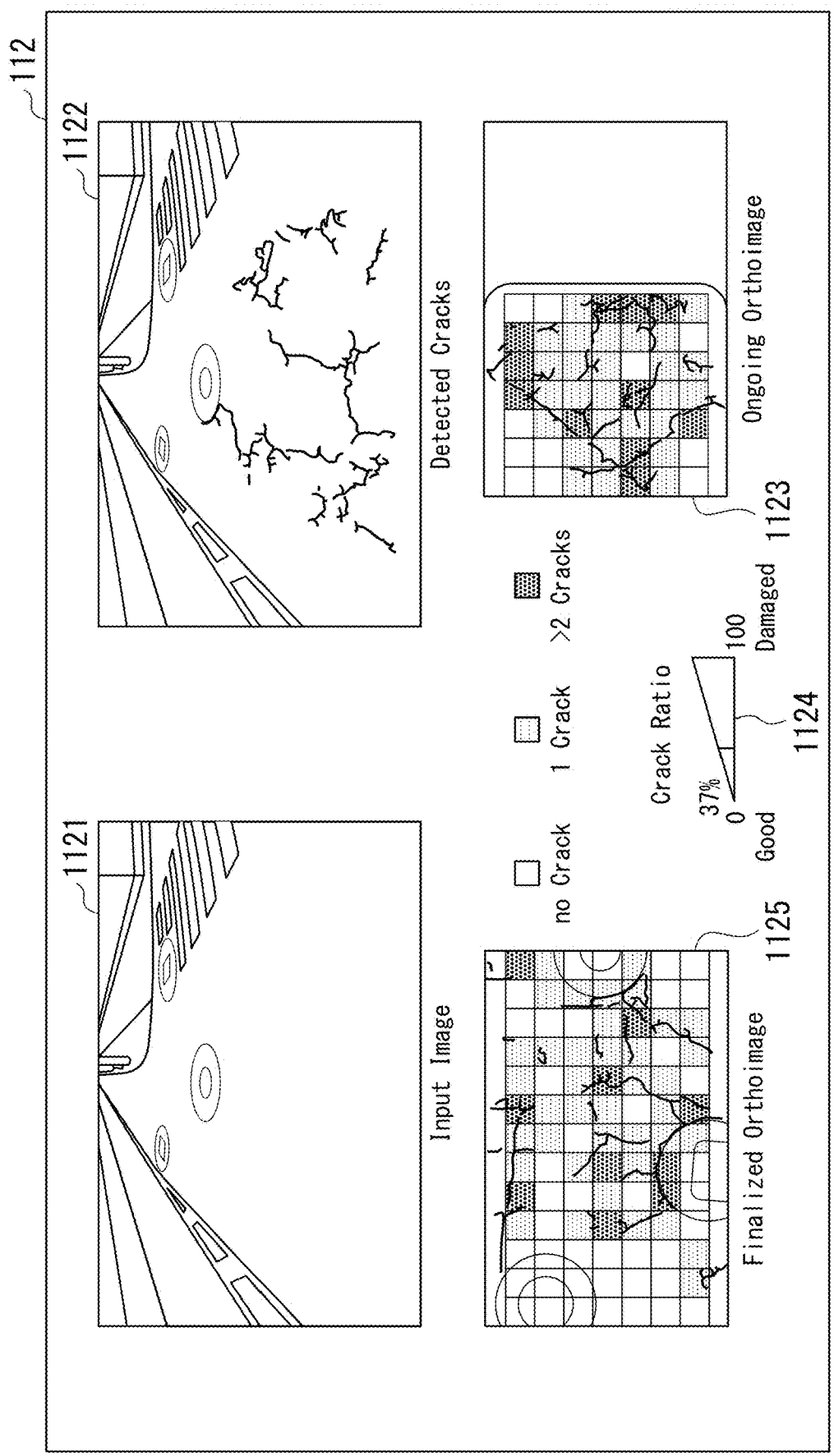
FIG. 5 is a diagram illustrating an example of an analysis process of the pavement crack analysis device according to the first embodiment.

FIG. 5 is a diagram illustrating an example of an analysis process which is performed by the pavement crack analysis device according to the first embodiment. FIG. 5 illustrates a state in which the pavement crack analysis device generates a cracks-superimposed image and calculates a crack ratio. The pavement crack analysis device calculates a crack ratio while generating a cracks-superimposed image at the same time as imaging on the basis of a captured image acquired from the on-board camera 21. FIG. 5 illustrates an example of a display screen which is displayed on the display 112.

In FIG. 5, the display 112 displays data such as a captured image 1121, a cracks-superimposed image 1122, a distribution of the numbers of cracks in counting in a predetermined range (an in-counting crack distribution) 1123, a crack ratio 1124, and a final distribution of the numbers of cracks 1125 counted in a predetermined range (a final crack distribution).

The captured image 1121 displays a captured image acquired by imaging one lane in which the vehicle travels with the on-board camera 21. That is, the cracks-superimposed image or the crack ratio displayed in FIG. 5 indicates an analysis result for one lane in which the vehicle travels. In the captured image displayed in the captured image 1121, an image flows upward in FIG. 5 (to the rear side of the vehicle) with traveling of the vehicle 20. The captured image 1121 may be an image which is cut out (trimmed) from an original image captured with the on-board camera 21 to a predetermined range.

The cracks-superimposed image 1122 displays an image in which pavement cracks are superimposed on the captured image displayed in the captured image 1121. The cracks in the road surface displayed in the cracks-superimposed image 1122 is crack shape data which is colored in a predetermined color and expressed by a line segment with a predetermined thickness for the purpose of easy visual recognition. The cracks-superimposed image 1122 superimposes newly detected pavement cracks on the captured image which flows upward with traveling of the vehicle.

The in-counting crack distribution 1123 and the final crack distribution 1125 display a counting result of the number of cracks for each square by converting the cracks-superimposed image 1122 into an ortho-image and superimposing squares with a mesh of 0.5 m.

The in-counting crack distribution 1123 indicates that counting of the number of cracks progresses from left to right in the drawing. A drawing right-left direction (hereinafter referred to as a "width direction") indicating the width direction of the road in the in-counting crack distribution 1123 corresponds to a drawing up-down direction (hereinafter referred to as a "range direction") indicating a range direction of the road in the cracks-superimposed image 1122. That is, when the vehicle 20 travels, the cracks-superimposed image 1122 flows from the bottom to the top. On the other hand, the crack distribution drawing of the in-counting crack distribution 1123 illustrates a state in which the squares displaying the counting result from left to right increase. FIG. 5 illustrates a state in which the counting result of cracks from the left end to the seventh square is displayed (the counting result of an eighth square is subsequently displayed). When the display of the squares in the in-counting crack distribution 1123 reaches a thirteenth square of the right end, counting of cracks in a road surface length range of 6.5 m ends. The display of the in-counting crack distribution 1123 having reached to the thirteenth square is shifted to the final crack distribution 1125. When the display is shifted to the final crack distribution 1125, the display of the in-counting crack distribution 1123 is deleted and squares indicating the counting result of cracks on the road surface in a next range are displayed from the left end.

Hatching displayed in the in-counting crack distribution 1123 and the final crack distribution 1125 indicates that the number of cracks counted is displayed in a color code. That is, a part having no hatched square is a part in which no cracks are counted in the range and the square is displayed in green. That is, a square displayed in green has a crack ratio of 0%. A part having a coarsely hatched square is a part in which one crack is counted and the square is displayed in yellow. That is, a square displayed in yellow has a crack ratio of 60%. A part having a densely hatched square is a part in which two or more cracks are counted and the square is displayed in red. That is, a square displayed in red has a crack ratio of 100%.

The range direction in the in-counting crack distribution 1123 and the final crack distribution 1125 includes seven squares, that is, indicates that the lane width of the lane in which the vehicle travels is about 3.5 m. The number of squares displayed in the width direction of the road may be increased or decreased.

The counting result of cracks for each square displayed in a color code is stored, for example, as CSV data in the inspection result data storage 108. The counting result of a road with a lane width 3.5 m×a road surface length 6.5 m is stored as CSV data of seven columns and thirteen rows.

The crack ratio 1124 displays the calculated crack ratio as a numerical value and a graph. The crack ratio displayed in the crack ratio 1124 is, for example, a value for each square displayed in the in-counting crack distribution 1123. The crack ratio displayed in the crack ratio 1124 may be an average value of the squares in a predetermined range. The predetermined range may be, for example, a range of squares in the width direction of the road (0.5 m×3.5 m) or a range of squares of 10 m in the traveling direction of the vehicle (10 m×3.5 m). By displaying the crack ratio 1124, a user can easily visually recognize a variation of the crack ratio over time. The variation of the crack ratio displayed in the crack ratio 1124 may be output, for example, as a tone height by sound via a speaker or the like.

The cracks-superimposed image, the crack distribution, or the display screen of the display 112 which has been described with reference to FIG. 5 is appropriately stored in the inspection result data storage 108.

Calculation results of a cracks-superimposed image and a crack ratio will be described below.

Figure 6:
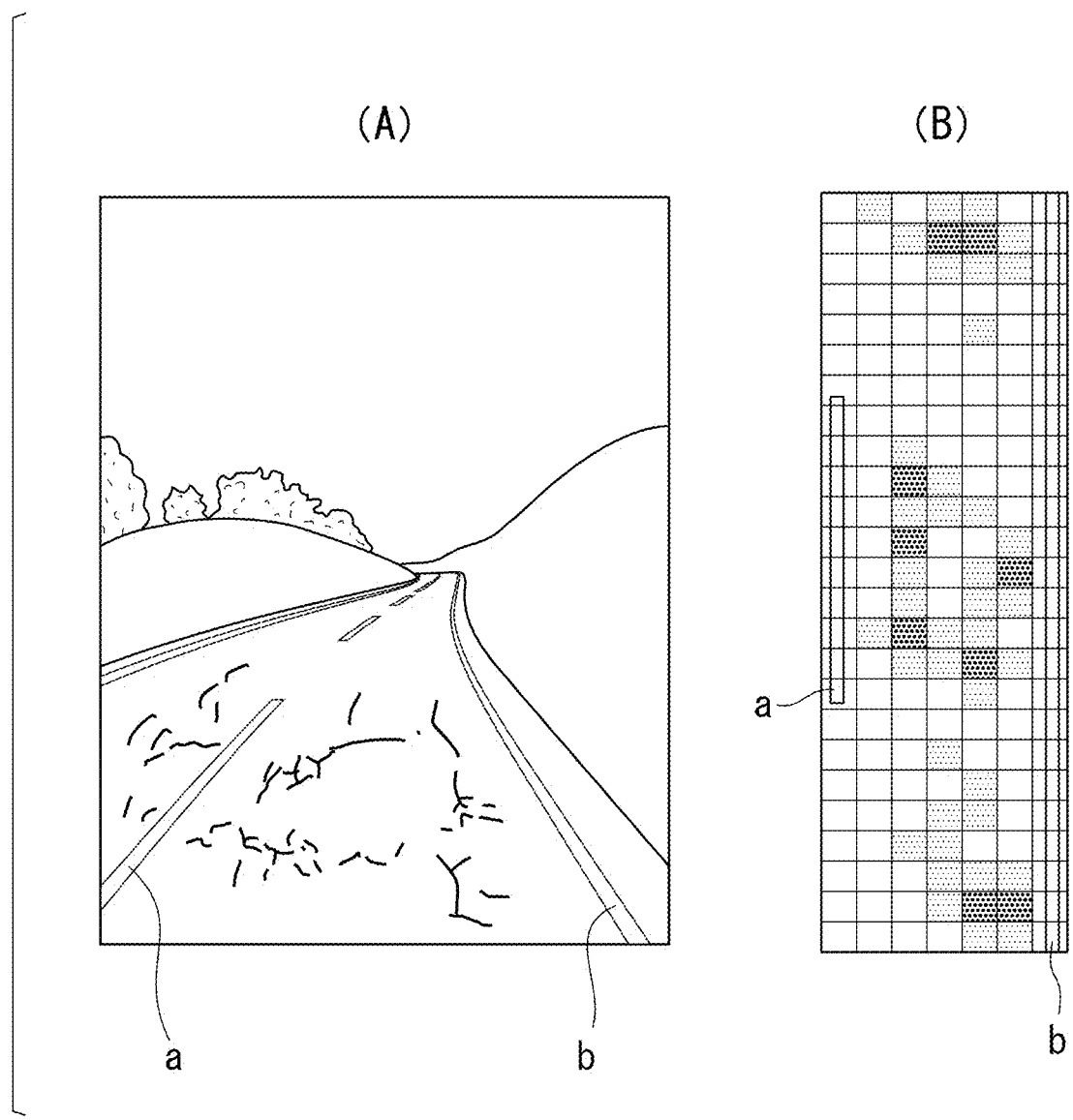
FIG. 6 is a diagram illustrating an example of a cracks-superimposed image and a calculation result of a crack ratio according to the first embodiment.

FIG. 6 is a diagram illustrating an example of calculation results of (A) a cracks-superimposed image and (B) a crack ratio in the first embodiment.

FIG. 6(A) illustrates an example of a cracks-superimposed image described above with reference to FIG. 5. FIG. 6(A) illustrates a captured image for detecting cracks of one lane in which the vehicle travels, but cracks of the oncoming lane can be detected therefrom. Since the on-board camera 21 images a road surface at a predetermined angle of depression, a lane or a background other than an analysis target from a captured image in addition to the road surface which is an analysis target may appear in the captured image. Accordingly, when the captured image is subjected to orthographic conversion, the ortho-image includes an image in an extra range. Therefore, the pavement crack detector 106 may determine a range which will be converted into an ortho-image on the basis of an image of an object included in the captured image. In FIG. 6, an example in which a range which is converted into an ortho-image is determined on the basis of a white line included in the captured image is illustrated.

A centerline a and a lane side line b appear in the captured image illustrated in FIG. 6(A). The pavement crack detector 106 can detect the lane width and determine a range of the road surface from which a crack ratio is calculated, by recognizing the centerline a and the lane side line b.

In detecting the lane width, white lines of the centerline a and the lane side line b can be detected by performing a differentiating process on the captured image, and a distance between the white lines can be detected on the basis of the detected white lines and the position data of the camera. The pavement crack detector 106 may recognize the lane width on the basis of the section attribute information of the route illustrated in FIG. 3. A white line may not be in the centerline or the lane side line depending on a route which is an inspection target. By using the section attribute information of the route, it is possible to set the lane width even when an amount of information for detecting the lane width is small. When a lane width cannot be detected in a section in which white lines are not clear in a part of the route or a section in which there is no white line, the lane width set in the section attribute information may be used.

FIG. 6(B) illustrates an ortho-image which is generated on the basis of the lane width. FIG. 6(B) illustrates the same centerline a and the same lane side line b as in FIG. 6(A). FIG. 6(B) illustrates that squares indicating a crack ratio are superimposed on an ortho-image based on the lane width. In FIG. 6(B), an image of cracks illustrated in the crack distribution in FIG. 5 is not displayed. A setting of whether to superimpose an image of cracks on an ortho-image may be changed.

A report table which is prepared by the report table preparing and outputting unit 110 will be described below.

FIG. 7 is a diagram illustrating an example of report table which is output from the pavement crack analysis device according to the first embodiment.

The report table illustrated in FIG. 7 is prepared by conventional human work and a format of the report table is determined in advance. The pavement crack analysis device can save work of preparing a report table by preparing and outputting a report table on the basis of inspection results of a crack ratio and the like.

In FIG. 7, a calculation result of an average value of crack ratios in all sections of a route which is an inspection target is input to an entry of "average crack ratio (%)."

Data of the "distance marks" in the section attribute information of the route which has been described above with reference to FIG. 3 is input to the entries of a "start point" and an "end point" of a "section." FIG. 7 illustrates an example in which there is no section with the attribute of bridge or tunnel.

Position data acquired by the position data acquiring unit 1013 on the basis of the data of "distance mark" in the section attribute information of the route is input to an entry of "position information." Since measurement data of the GPS may include an error, the position data input to the report table may be corrected. Correction of the position data may be performed on the basis of an azimuth or an acceleration as described above. Since the vehicle always travels on a road, the position data may be corrected such that positions of the position data appearing on a map are on the road.

Data of the section attribute information of the route can be input to entries of "section distance" and "inspection time."

The report table which is prepared by the report table preparing and outputting unit 110 and illustrated in FIG. 7 can be output in a predetermined document format. The prepared report table may be displayed on a screen of the display 112 via the display control unit 111.

Figure 8:
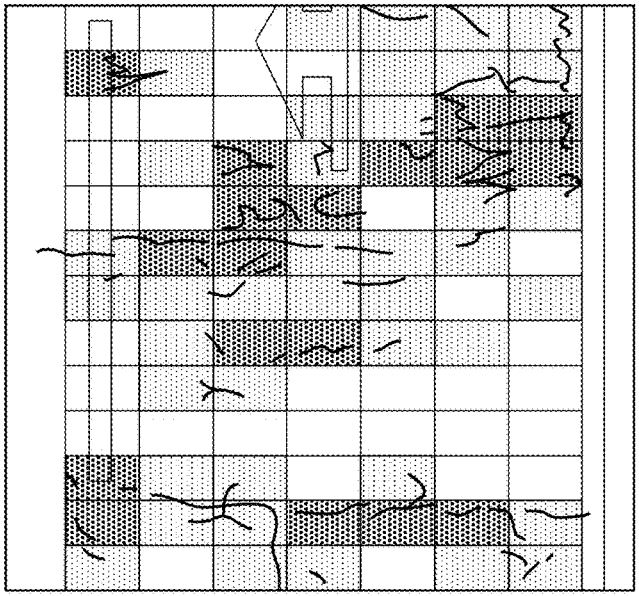
FIG. 8 is a diagram illustrating another example of a report table which is output from the pavement crack analysis device according to the first embodiment.

FIG. 8 is a diagram illustrating another example of a report table which is output from the pavement crack analysis device according to the first embodiment.

In FIG. 8, an average value of the crack ratios in a predetermined section is input to an entry of "crack %." In FIG. 8, an average crack ratio in a section of which the distance from the start point 0 m ranges from 100 m to 200 m is calculated and acquired. A representative cracks-superimposed image and a crack ratio distribution for each square in the section of 100 m to 200 m are input.

The report table which is prepared by the report table preparing and outputting unit 110 and illustrated in FIG. 8 can be output in a predetermined document format. The prepared report table may be displayed on a screen of the display 112 via the display control unit 111.

Display data using geographic information which is prepared by the pavement crack analysis device will be described below.

Figure 9:
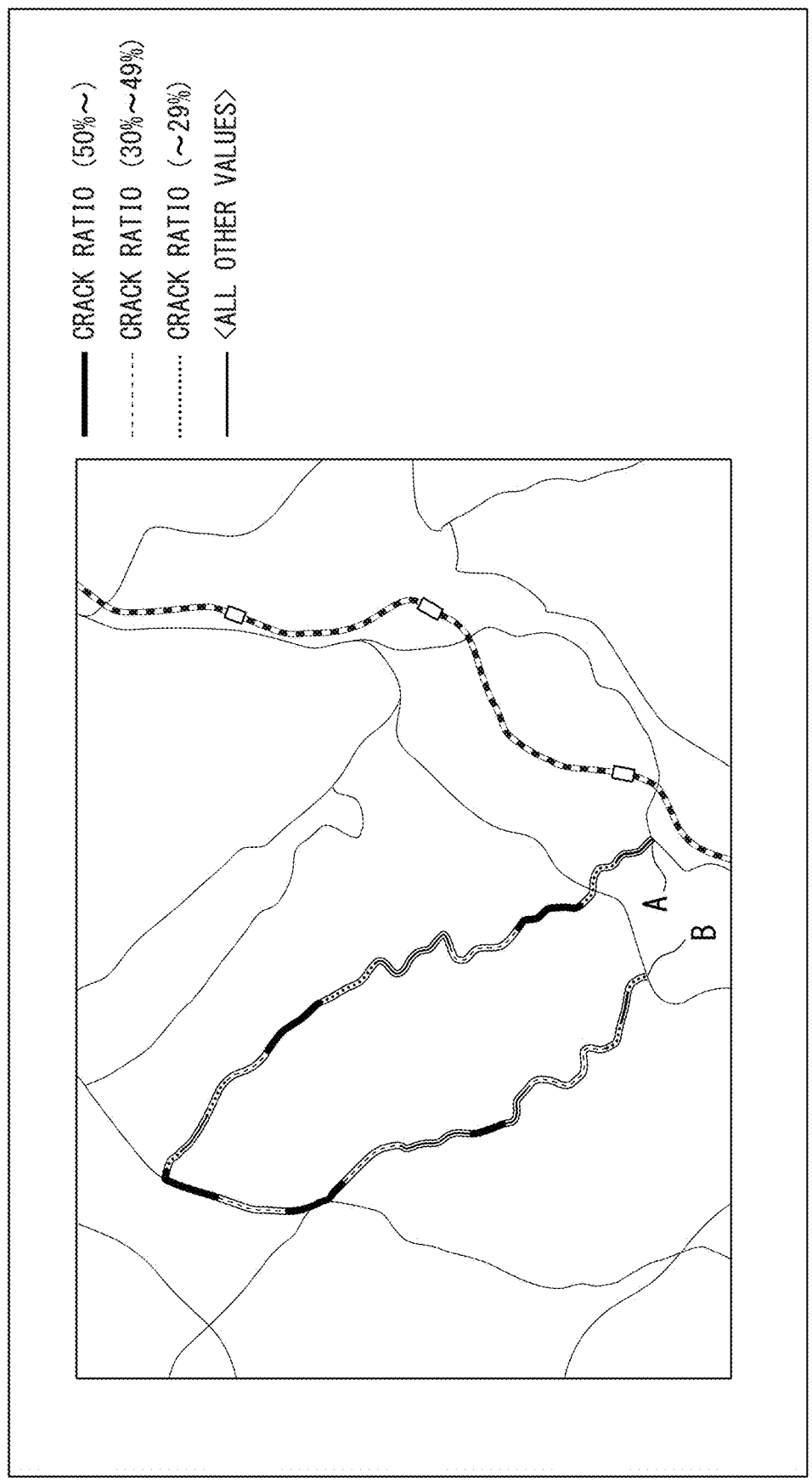
FIG. 9 is a diagram illustrating an example of display data using geographic information which is prepared by the pavement crack analysis device according to the first embodiment.

FIG. 9 is a diagram illustrating an example of display data using geographic information which is prepared by the pavement crack analysis device according to the first embodiment. The geographic information used in FIG. 9 is map information.

The crack ratio calculator 107 calculates a crack ratio of a predetermined section described above with reference to FIG. 5 or 6 or the like in correlation with the position data acquired by the position data acquiring unit 1013 and stores the calculated crack ratio in the inspection result data storage 108. The display control unit 111 superimposes and displays a measuring position of a crack ratio on the map information using a line segment with a predetermined shape (which includes a color) on the basis of the crack ratio and the position data stored in the inspection result data storage 108. The line segment superimposed on the map information is displayed in a color code depending on the crack ratio of the section. For example, in a route from a start point A to an end point B illustrated in FIG. 9, it is assumed that line segments are displayed in four colors depending on the crack ratio. It is assumed that a line segment with a crack ratio of 50% or more indicated by a thick line is displayed in a first color. It is assumed that a line segment with a crack ratio of 30% to 49% indicated by a broken line is displayed in a second color. It is assumed that a line segment with a crack ratio of 29% or less indicated by a dotted line is displayed in a third color. It is assumed that a line segment without any calculated crack ratio indicated by a thin line is displayed in a fourth color.

When a line segment indicating a crack ratio is superimposed on the geographic information such as the map information and displayed, a crack ratio distribution in all the sections of the route can be easily understood.

For example, information of an aerial photograph may be used as the geographic information. The geographic information may be stored in advance, for example, in the inspection result data storage 108. The geographic information may be selected by a user and displayed. The color or thickness of a line segment indicating a crack ratio may be arbitrarily set.

FIG. 9 illustrates an example in which a map is displayed in a scale capable of displaying all the sections of the route, but the map may be enlarged or reduced. In display of a crack ratio, a display range may be changed depending on the scale of a map which is displayed. The color code of a display color indicating a crack ratio may be an average value of the section or may be set every predetermined distance. For example, when the scale of a map is 1/25,000, a color code depending on a crack ratio may be set every 1 km. When the scale of a map is 1/6,250, a color code depending on a crack ratio may be set every 100 m. When the scale of a map is 1/2,500, a color code depending on a crack ratio may be set every 13 m.

When a scale of a map is changed, the display color of a part with a large crack ratio (this part includes "a section" or "some continuous sections") in the displayed sections may be changed.

When one point on a line segment indicating a crack ratio illustrated in FIG. 9 is designated, detailed information at that point may be displayed. For example, when one point on the map is designated, a cracks-superimposed image at the designated point may be displayed. When the scale is changed, the pavement crack analysis device can overlook the whole route on a map with a small scale. Since the pavement crack analysis device measures the crack ratio for each square of a mesh of 0.5 m and stores the measured crack ratio along with position data, detailed information of square units can be displayed on a map with a large scale.

Figure 10:
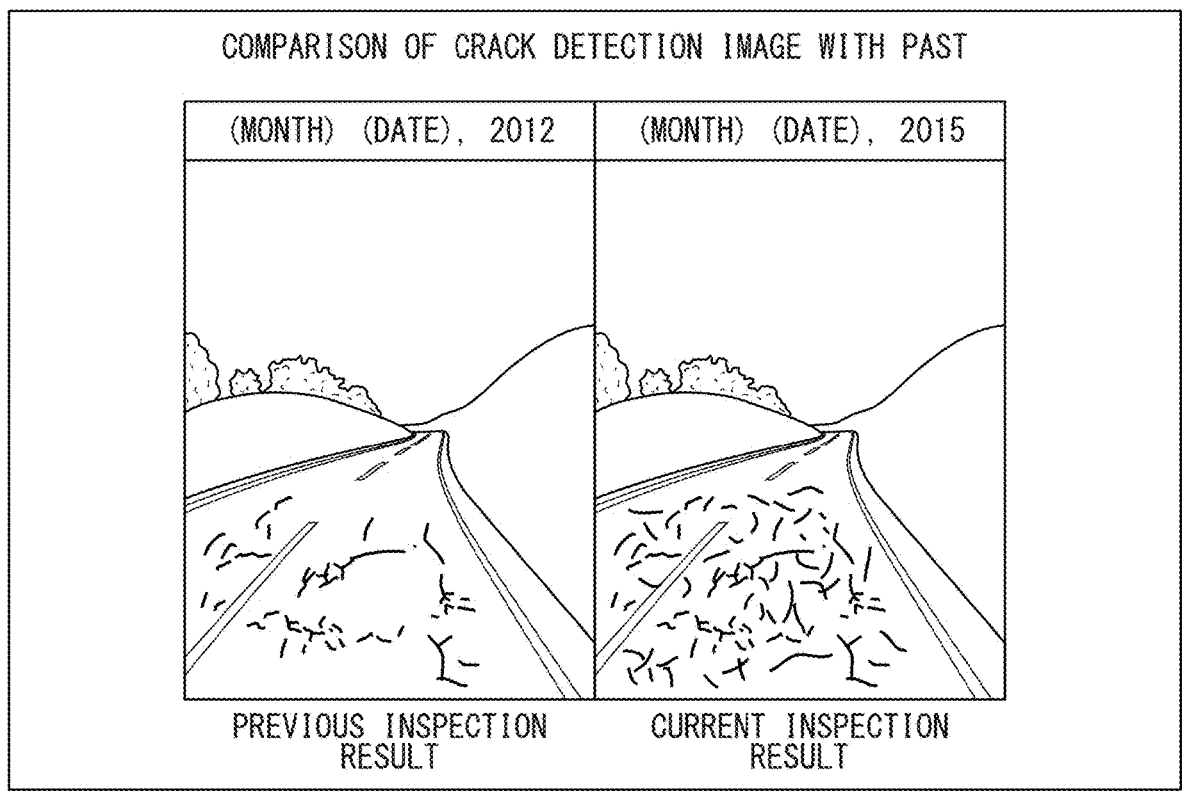
FIG. 10 is a diagram illustrating an example of screen data including a plurality of cracks-superimposed images which are generated by the pavement crack analysis device according to the first embodiment.

In order to compare a plurality of cracks-superimposed images, it is preferable that a background be simultaneously displayed as illustrated in FIG. 10. When an image is displayed in concordance with the background, a user can confirm the cracks-superimposed images at the same measuring points.

Application of First Embodiment: Comparison with Past State

In this embodiment, an example in which the display control unit 111 generates screen data for arranging and displaying a plurality of cracks-superimposed images to be compared with each other has been described, but the display method capable of comparing a plurality of cracks-superimposed images is not limited thereto. For example, the display control unit 111 may switch and display a plurality of cracks-superimposed images having different imaging dates and times at the same display position. For example, the display control unit 111 can generate screen data for arranging and displaying two cracks-superimposed images of a cracks-superimposed image captured three years ago and a cracks-superimposed image captured recently.

Display switching may be performed in response to a predetermined operation by a user. The display control unit 111 can facilitate comparison of the crack shape data at the same screen position of the display 112 by switching the cracks-superimposed images. For example, the display control unit 111 may switch the imaging dates and times of the cracks-superimposed images to be displayed. The imaging dates and times to be displayed are not limited to two times, but for example, the display control unit 111 may display cracks-superimposed images at three imaging dates and times of five years ago, three year ago, and recently. By displaying the past images and the latest image to be compared, a user can visually recognize a variation of road surface properties over time (for example, aging).

The display control unit 111 may display a difference between crack shape data of a plurality of cracks-superimposed images. When the display control unit 111 displays the difference, a variation of the crack shape data can be easily recognized visually.

The display control unit 111 may generate an image for comparing a past image and a latest image from the past image and the latest image and generate screen data for displaying the generated image.

Display of screen data including a plurality of cracks-superimposed images which is generated by the pavement crack analysis device will be described below. FIG. 10 is a diagram illustrating an example of screen data including a plurality of cracks-superimposed images which is generated by the pavement crack analysis device according to the first embodiment. The screen data illustrated in FIG. 10 can be prepared by the display control unit 111 and can be displayed by the display 112.

In FIG. 10, the left part in the drawing illustrates a cracks-superimposed image on which previous inspection was performed in 2012. On the other hand, the right drawing of FIG. 10 illustrates a cracks-superimposed image on which current inspection was performed in 2015. When an image for comparison of a plurality of cracks-superimposed images having different inspection dates and times is generated and displayed, a user can easily understand a deterioration state of the road surface over time.

FIG. 10 illustrates an example in which two cracks-superimposed images are compared, but the number of cracks-superimposed images to be compared is not limited to two. For example, five cracks-superimposed images over five years may be displayed to be compared.

A plurality of cracks-superimposed images to be compared may be arranged and displayed, or may be sequentially displayed at the same display position on the screen of the display 112. When a plurality of cracks-superimposed images are sequentially displayed at the same display position on the screen of the display 112, a user can visually recognize a part that varies like a moving image. A difference between a plurality of cracks-superimposed images to be compared may be displayed. For example, when crack differences are sequentially displayed with respect to a reference cracks-superimposed image every year, a user can visually recognize a growing course of a crack.

Figure 11:
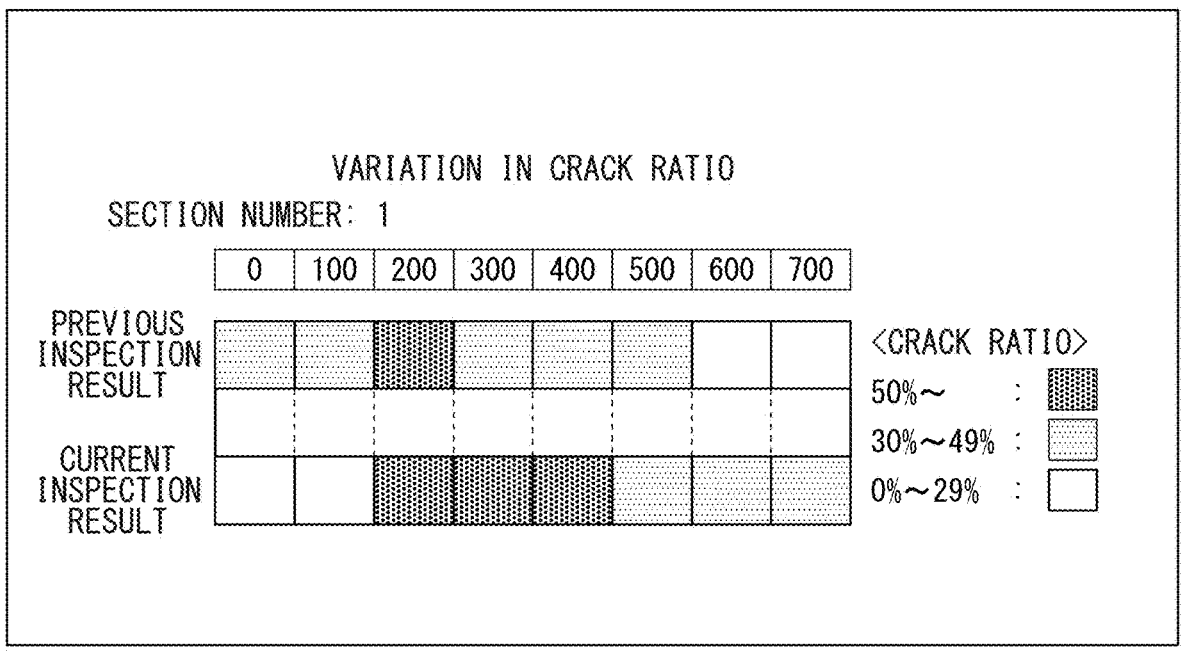
FIG. 11 is a diagram illustrating an example of a change of a crack ratio which is calculated by the pavement crack analysis device according to the first embodiment.

Display of a variation of a crack ratio which is calculated by the pavement crack analysis device will be described below. FIG. 11 is a diagram illustrating an example of a variation of a crack ratio which is calculated by the pavement crack analysis device according to the first embodiment.

In FIG. 11, a crack ratio every 100 m when a section with Section number 1 is divided into eight subdivisions is displayed on the display screen of the display 112. For example, the range of "0" in FIG. 11 indicates a range from a start point 0 m to 100 m.

The upper part of FIG. 11 indicates a crack ratio for each section in a previous inspection result, and the lower part indicates a crack ratio for each section in a current inspection result. For example, in ranges of "0" and "100," the crack ratio in the current inspection result has been improved in comparison with the previous inspection result. Improvement in crack ratio represents that the road surface in the range has been repaired. On the other hand, in ranges of "0," "100," "600," and "700," the crack ratio in the current inspection result has deteriorated in comparison with the previous inspection result. That is, in the display of the variation in crack ratio illustrated in FIG. 11, it is possible to understand deterioration in road surface properties over time and to understand a repairing state of the road surface. FIG. 11 illustrates an example in which the previous inspection result and the current inspection result are displayed, but for example, the inspection result over a plurality of years may be simultaneously displayed. When the variations in a crack ratio in the years are simultaneously displayed, a user can understand deterioration of the road surface and a repairing state.

The display range of the crack ratio may be changed according to settings. For example, the crack ratios in a plurality of sections may be displayed.

Second Embodiment

An embodiment in which a function of correcting a determined crack ratio is provided will be described below as a second embodiment.

FIG. 12 is a block diagram illustrating an example of a functional configuration of a crack analysis system according to the second embodiment.

In FIG. 12, a crack analysis system (a crack analysis device) includes a pavement crack analysis device 1 and a pavement crack analysis device 2. The pavement crack analysis device 1 further includes an output unit 113 in addition to the pavement crack analysis device 1 described above with reference to FIG. 1. Among the functions of the pavement crack analysis device 1, the same functions as in the pavement crack analysis device 1 are referenced by the same reference signs.

The output unit 113 outputs data stored in the inspection result data storage 108 to the pavement crack analysis device 2 via a network 3. The output unit 113 may be, for example, a web server that outputs requested data in response to a data acquisition request from the pavement crack analysis device 2. The data output from the output unit 113 is data stored in the inspection result data storage 108 and examples thereof include a captured image converted into an ortho-image, a cracks-superimposed image, crack shape data (vector data or raster data indicating a shape of a crack), and crack data (such as a crack ratio and the number of cracks). The type of data which is output from the output unit 113 may be determined in response to a request from the pavement crack analysis device 2.

The output unit 113 may be connected to the network 3 in a wired manner or a wireless manner. The output unit 113 may have a function of receiving data from the pavement crack analysis device 2.

The data output from the output unit 113 may be output from the inspection result output unit 109 to a recording medium. For example, the pavement crack analysis device 2 which cannot acquire data from the output unit 113 via the network 3 may be provided with data stored in the inspection result data storage 108 using a recording medium instead of acquiring data from the output unit 113. Examples of the recording medium include a hard disk drive, a memory card, and an optical disc. The output unit 113 includes a recording unit for a recording medium which is not illustrated.

The pavement crack analysis device 2 includes an input unit 201, a registrator 202, an input information acquirer 203, an editing operator registering unit 204, an input information storage 205, a pavement crack information reflecting unit 206, a crack ratio calculator 207, an editing result data storing unit 208, an inspection result output unit 209, a report table preparing and outputting unit 210, a display control unit 211, and a display unit 212. Among the functions of the pavement crack analysis device 2, the functions of the crack ratio calculator 207, the inspection result output unit 209, the report table preparing and outputting unit 210, the display control unit 211, and the display unit 212 are the same as the functions of the inspection result output unit 109, the report table preparing and outputting unit 110, the display control unit 111, and the display 112 of the pavement crack analysis device 1 and thus description thereof will be partially omitted.

The input unit 201 includes a network data input unit 2011 and a media data input unit 2012.

The network data input unit 2011 acquires input information such as an image of a captured image converted into an ortho-image, a cracks-superimposed image, crack shape data (such as raster data or vector data) or crack data (such as a crack ratio or the number of cracks) from the output unit 113 of the pavement crack analysis device 1 via the network 3. The network data input unit 2011 may be connected to the network 3 in a wired manner or a wireless manner.

The media data input unit 2012 acquires input information such as a captured image converted into an ortho-image, image data of a cracks-superimposed image, crack shape data, or crack data of the pavement crack analysis device 1 from a recording medium. The media data input unit 2012 includes a reading unit of a recording medium which is not illustrated.

FIG. 12 illustrates an example in which the input unit 201 includes the network data input unit 2011 and the media data input unit 2012, but the input unit 201 may include any one of the network data input unit 2011 and the media data input unit 2012. For example, when the pavement crack analysis device 2 is installed in a place with a network connection environment, the input unit 201 can acquire input information on-line via the network 3 by including at least the network data input unit 2011. When the pavement crack analysis device 2 is installed in a place without a network connection environment, the input unit 201 can acquire input information via a recording medium by including at least the media data input unit 2012.

The registrator 202 includes an editing operator information input unit 2021. The editing operator information input unit 2021 acquires information of an editing operator. The editing operator is a user of the pavement crack analysis device 2 and is a person who performs editing work on the pavement crack analysis device 2. Examples of the information of the editing operator include a name and an ID of the editing operator. The registrator 202 registers the information of the editing operator acquired by the editing operator information input unit 2021 in the editing operator registering unit 204.

The input information acquirer 203 stores the input information acquired from the input unit 201 in the input information storage 205. The editing operator registering unit 204 stores the editing operator information acquired by the registrator 102 in the input information storage 205. The input unit 201 and the registrator 202 may be mounted as a single function.

The input information storage 205 stores the input information acquired by the input information acquirer 203 and the editing operator information acquired by the editing operator registering unit 204. A storage device such as a hard disk drive can be used for the input information storage 205. The input information storage 205 stores the captured image converted into an ortho-image, the crack shape data, the cracks-superimposed image, or the crack data which is acquired by the input information acquirer 203.

An editing unit 213 reads the input information (the captured image converted into an ortho-image, the cracks-superimposed image, the crack shape data, or the crack data) stored in the input information storage 205 and displays an editing screen on a display unit of a display device which is not illustrated. The editing screen may be displayed on the display unit 212. The editing unit 213 functions as a crack data editing unit that displays at least an image of the captured image and the crack data on the editing screen and allows a user to edit the crack data. The crack data includes a crack ratio, the number of cracks, or a color code for expressing them for each square as described above, and the editing unit 213 displays a color code for expressing the number of cracks, for example, for each square to allow a user to edit the crack data by changing the color code for each square. The editing unit 213 acquires editing information which is an editing result for the crack data and stores the editing information in the input information storage 205. The editing unit 213 changes the editing screen on the basis of the editing information stored in the input information storage 205.

Editing of crack data in this embodiment includes a case in which crack data is not changed but is only confirmed in addition to a case in which crack data is changed. Accordingly, a state in which crack data is completely edited in an editing process which will be described later refers to a state in which an editing operator has confirmed the crack data.

The editing unit 213 functions as a crack shape data editing unit that displays crack shape data on the editing screen and allows a user to edit the crack shape data. The crack shape data includes vector data or raster data indicating a shape of cracks as described above. The editing unit 213 displays a captured image and crack data on the editing screen for comparison and allows a user to perform editing such as addition, deletion, or changing on the crack shape data. Details of the editing screen for editing the crack shape data will be described later.

The pavement crack information reflecting unit 206 reflects the editing information stored in the input information storage 205 in original crack data to update the crack data. Updating of the crack data can be performed by updating a value of CSV data. For example, when a lane width is 3.5 m and a width of a square is 0.5 m, a predetermined row of the CSV data has seven values. When a predetermined row of the original crack data is (0,0,0,1, 2,1,0), the pavement crack information reflecting unit 206 can update the crack data by changing the row to (0,0,1,2, 2,1,0). The pavement crack information reflecting unit 206 stores the updated crack data along with image data of the captured image converted into an ortho-image or the cracks-superimposed image stored in the input information storage in the editing result data storing unit 208. The updating of crack data may reflect the editing information indicating the same values without changing the crack data. In this embodiment, an example in which the pavement crack information reflecting unit 206 reflects the editing information in the original crack data to update the crack data has been described above, but, for example, the editing unit 213 may update the crack data.

The crack ratio calculator 207 calculates a crack ratio in the same way as in the crack ratio calculator 107 on the basis of the input information stored in the input information storage 205. The crack ratio calculator 207 stores the calculated crack ratio in the editing result data storing unit 208.

FIG. 12 illustrates an example in which the crack analysis system according to the second embodiment includes the pavement crack analysis device 1 and the pavement crack analysis device 2. However, the crack analysis system may embody the functions of the pavement crack analysis device 1 and the pavement crack analysis device 2 using a single device. That is, FIG. 12 illustrates an example in which the input information such as the captured image converted into an ortho-image, the cracks-superimposed image, the crack shape data, or the crack data of the pavement crack analysis device 1 is transmitted from the pavement crack analysis device 1 to the pavement crack analysis device 2 via the network 3 or a recording medium, but the input information may be transmitted in the same device by embodying the pavement crack analysis device 1 and the pavement crack analysis device 2 as a single device. When the pavement crack analysis device 1 and the pavement crack analysis device 2 are embodied as a single device, the crack detecting process and the editing process can be performed in the same device. When the pavement crack analysis device 1 and the pavement crack analysis device 2 are embodied as a single device, the functions of the devices may be unified and may be implemented by the same functional block. For example, the input unit 101 and the input unit 201 are implemented by the same functional block. Similarly, the registrator 102 and the registrator 202, the input information acquirer 103 and the input information acquirer 203, the input information storage 105 and the input information storage 205, and the like may be mounted on the same functional blocks. By mounting the functions of the pavement crack analysis device 1 and the pavement crack analysis device 2 on the same functional block, it is possible to simplify the configuration of the pavement crack analysis system and to reduce costs thereof.

An operation routine of the pavement crack analysis device 2 described above with reference to FIG. 12 will be described below.

FIG. 12 is a flowchart illustrating an example of an operation routine of the pavement crack analysis device according to the second embodiment.

Figure 13:
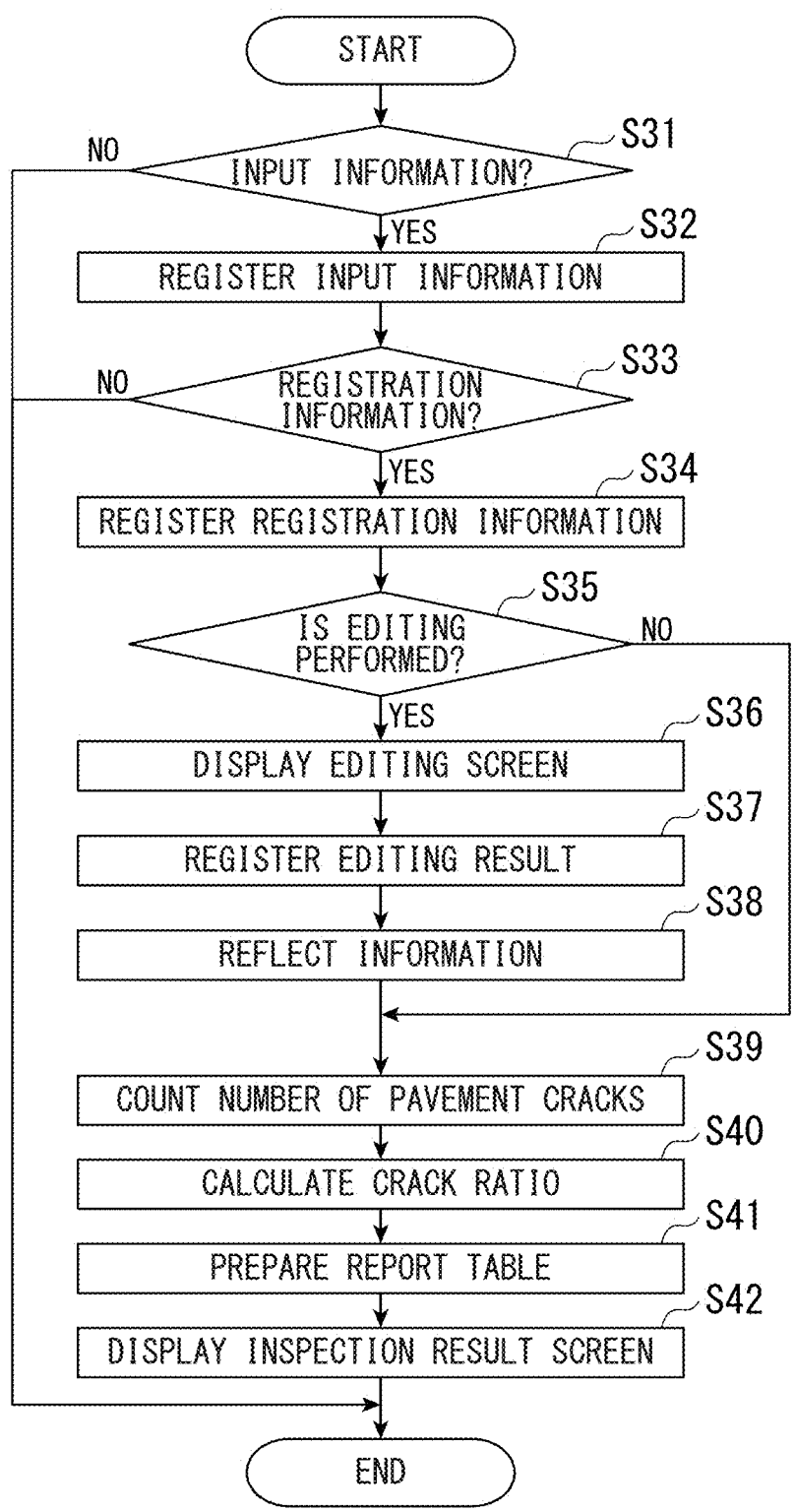
FIG. 13 is a flowchart illustrating an example of operations of a pavement crack analysis device according to the second embodiment.

In FIG. 13, the input information acquirer 203 determines whether there is input information input from the input unit 201 (Step S31). The input information is acquired from the pavement crack analysis device 1 and is input from the input unit 201 to the input information acquirer 203.

When it is determined that there is no input information (NO in Step S31), the routine illustrated in the flowchart of FIG. 13 is ended (end). The ended routine is restarted (start) and the process of Step S31 is performed.

On the other hand, when it is determined that there is input information (YES in Step S31), the input information acquirer 203 registers (stores) the input information in the input information storage 205 (Step S32).

After the process of Step S32 is performed, the editing operator registering unit 204 determines whether there is registration information of an editing operator input from the registrator 202 (Step S33).

When it is determined that there is no registration information (NO in Step S33), the routine illustrated in the flowchart of FIG. 13 is ended (end). The ended routine is restarted (start) and the process of Step S13 is performed.

On the other hand, when it is determined that there is registration information (YES in Step S33), the editing operator registering unit 204 registers (stores) the registration information in the input information storage 205 (Step S34).

After the process of Step S34 is performed, the editing unit 213 determines whether editing needs to be performed (Step S35). The determination of whether editing should be performed can be performed depending on whether a user's operation is performed on a display screen which is displayed on the display unit 212 by the editing unit 213. In the following description, it is assumed that the editing unit displays an editing screen or the like on the display unit 212.

When it is determined that editing should be performed (YES in Step S35), the editing unit 213 displays an editing screen on the display unit 212 (Step S36). The editing screen displays crack data such that the crack data can be changed by a user.

After the process of Step S36 is performed, the editing unit 213 stores (registers) the editing result (editing information) in the input information storage 205 (Step S37). The editing unit 213 can notify a user that the crack data is changed by displaying the editing result stored in the input information storage 205 on the editing screen. The editing unit 213 stores the information of an editing operator registered in the editing operator registering unit 204 and information of data and time at which the editing result is stored along with the editing result in the input information storage 205.

After the process of Step S37 is performed, the pavement crack information reflecting unit 206 changes the crack data on the basis of the editing result and stores the changed crack data in the editing result data storing unit 208.

After the process of Step S16 is performed, the crack ratio calculator 207 counts the number of pavement cracks changed (Step S39) and calculates a crack ratio (Step S40). The method of calculating a crack ratio is the same as the method in the crack ratio calculator 107.

After the process of Step S40 is performed, the report table preparing and outputting unit 210 prepares a report table in the same way as in the report table preparing and outputting unit 110 (Step S41). The report table preparing and outputting unit 210 prepares a report table in which the editing result in the editing unit 213 is reflected. Preparing of a report table (which may include re-preparing) may be automatically performed when the crack ratio is calculated, or may be performed by a user's manual operation. The report table to be prepared may be selected among a plurality of types by a user. Information to be input to the report table may be selected or corrected by a user. The report table prepared in Step S41 will be described later with reference to FIG. 15.

After the process of Step S41 is performed, the display control unit 211 displays a screen indicating an inspection result in which the editing result is reflected on the display unit 212 (Step S42). Displaying (re-displaying) of the inspection result in which the editing result is reflected may be automatically performed when the crack ratio is calculated, or may be performed by a user's manual operation, similar to the preparing of a report table.

After the process of Step S42 is performed, the routine illustrated in the flowchart of FIG. 13 is ended.

An editing process in the pavement crack analysis device 2 will be described below.

Figure 15:
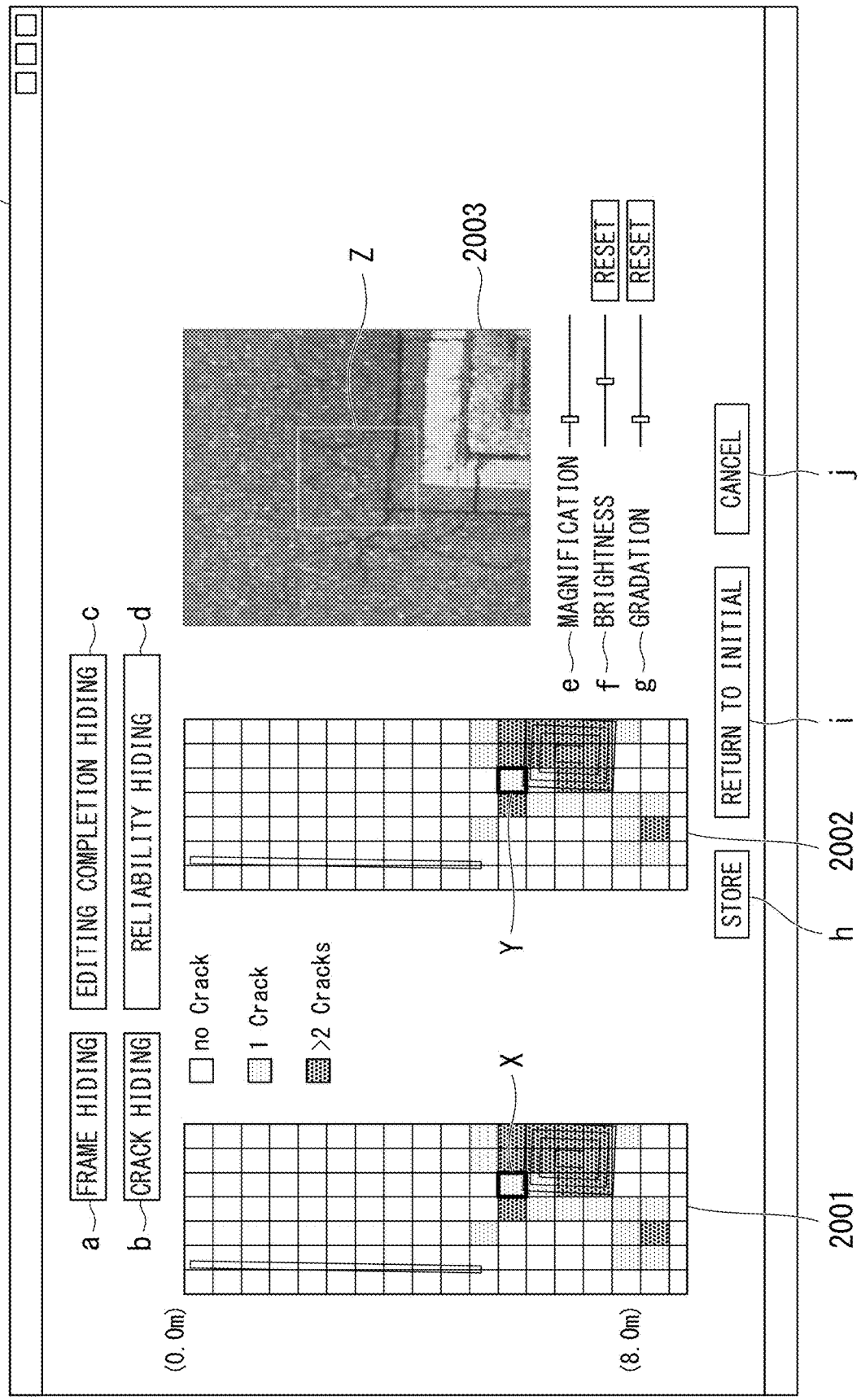
FIG. 15 is a diagram illustrating an example of an editing process which is performed by the pavement crack analysis device according to the second embodiment.

FIGS. 14 and 15 are diagrams illustrating an example of an editing process which is performed by the pavement crack analysis device according to the second embodiment.

In FIG. 14, the display unit 212 displays a crack editing TOP screen which is displayed in the editing process. The crack editing TOP screen is displayed, for example, when a user inputs an editing start instruction via a display screen which is not illustrated. On the crack editing TOP screen, the display unit 212 displays section attribute information 2121 and section editing information 2122 of a route.

The section attribute information 2121 includes information of "route name," "measurement date," and "weather." The section editing information 2122 includes information of "section number," "section," "editing status," "editing date and time," and "editor." "Route name," "measurement date," "weather," and "section number" are the same as illustrated in FIG. 5 and description thereof will not be repeated.

"Section" is a section of a road into which a route is divided every 100 m and FIG. 13 illustrates an example in which attributes of all the sections illustrated therein are "road" and does not include a section of which attributes are "bridge" and "tunnel."

Underlined character strings displayed in "section" indicate that the character strings are hyperlinks. When the character string of each "section" is selected by a user using a mouse or the like, an editing screen of a link destination corresponding to the selected section is displayed. For example, when the character string of "0 m~100 m" is selected, an editing screen corresponding to the section of "0 m~100 m" is displayed. The character strings of the hyperlinks may be, for example, character strings such as "section number."

"Editing status" is information indicating an editing status such as whether crack data of the section is edited (updated) by a editing operator. Display of "completion" in "editing status" indicates a state in which crack data of the section has been edited. Display of "incompletion" indicates that crack data of the section is not edited.

Display of an editing status may be performed by changing a display color of an edited section or applying a predetermined mark to the edited section in addition to displaying the section using characters such as "completion" and "incompletion."

"Editing date and time" is date and time at which the editing process of the section is completed. "Editor" is an editing operator name who has performed the editing process. Information of "editing date and time" and "editor" is supplementary information which is displayed when the editing status is completion. In this embodiment, an example in which the editing date and time and the editing operator in which the editing process has finally been performed for the section are displayed has been described, but the editing date and time and the editing operator for each editing process may be recorded and displayed, for example, when the editing process is performed multiple times.

FIG. 15 illustrates a display screen of the editing process which is displayed on the display unit 212 when the hyperlink of one section in FIG. 14 is selected.

An editing screen 2000 includes editing display parts of an initial state 2001, an in-editing 2002, and a selection part 2003.

The initial state 2001 is display in which color-coded squares indicating crack ratios are superimposed on an ortho-image of a captured image similarly to FIG. 6(B). An editing operator can scroll an image of the initial state 2001 in the range direction using a mouse or a keyboard which is not illustrated.

Display of (0, 0) in an upper part of the initial state 2001 denotes a start point of a section. The editing operator can display a captured image in an arbitrary range within 100 m from the start point of the section to the end point by scrolling the image of the initial state 2001.

A centerline (a white line) of a road appears in the upper-left part of the initial state 2001. An inspection hole installed on the road and a repairing trace of a repairing material used to repair the periphery of the inspection hole appear in the lower-right part of the initial state 2001. A frame appearing in a square in the upper-left of the repairing material denotes that the square is completely edited.

In the upper part of the display screen of the initial state 2001, selection buttons of a frame hiding a, a crack hiding b, an editing completion hiding c, and a reliability hiding d are disposed. A selected state of each selection button can be changed, for example, by click with a mouse.

The frame hiding a is a selection button for selecting whether squares should be superimposed and displayed on the captured image of the initial state 2001. FIG. 15 illustrates a case in which squares are superimposed and displayed. The squares include display of colors indicating crack ratios. In FIG. 15, a part with non-hatched squares is a part with a crack ratio of 0% in which no cracks are counted in the range, and the squares are displayed in green on the display screen. A part with coarsely hatched squares is a part with a crack ratio of 60% in which one crack is counted, and the squares are displayed in yellow. A part with densely hatched squares is a part with a crack ratio of 100% in which two or more cracks are counted, and the squares are displayed in red. The editing operator can switch a square between display and hiding of a color whenever the frame hiding a is selected.

The crack hiding b is a selection button for selecting whether crack shape data should be superimposed and displayed on the captured image of the initial state 2001. The crack shape data is drawn in a predetermined color and is expressed with a line segment of a predetermined thickness such that the editing operator can easily view the crack shape data on the display screen. FIG. 15 illustrates a case in which the crack shape data is not displayed. The editing operator can switch the crack shape data between display and hiding whenever the crack hiding b is selected.

The editing completion hiding c is a selection button for selecting whether a grid-line indicating completion of editing should be superimposed and displayed on the captured image of the initial state 2001. The grid-line indicating completion of editing is painted with a predetermined color and is expressed by a grid-line with a predetermined thickness surrounding a square such that the editing operator can easily view the grid-line. FIG. 15 illustrates a case in which the grid-line indicating completion of editing is displayed. The editing operator can switch the grid-line indicating completion of editing between display and hiding whenever the editing completion hiding c is selected.

The reliability hiding d is a selection button for selecting whether reliability should be superimposed and displayed on the captured image of the initial state 2001. Display of reliability indicates reliability for detection of cracks which are detected by the pavement crack detector described above with reference to FIG. 1. A method of determining reliability is arbitrary.

For example, in this embodiment, the number of cracks detected for each square is classified into three groups of zero, one, and two or more, and whether detected cracks should be recognized as cracks may be determined depending on whether a predetermined parameter such as a length, a thickness, or contrast of the detected cracks is within a predetermined threshold range. When the detection results of the number of cracks are the same number but the predetermined parameter is close to the threshold value, it can be determined that reliability for detection of the square is low. On the other hand, when the predetermined parameter gets distant from the threshold value, it can be determined that reliability for detection of the square is high.

When shadows of trees appear in a captured image and image processing of removing the shadows of trees is performed, an image of cracks included in the captured image is affected by the image processing and detection accuracy thereof decreases. It can be determined that reliability for a square subjected to the image processing of removing shadows or the like is low.

The reliability can be displayed in the initial state 2001, for example, by displaying a square in a color other than green, yellow, and red or adding a predetermined mark to the square. The editing operator can achieve enhancement in efficiency of work by performing an editing operation on the square displayed to have low reliability. FIG. 15 illustrates a case in which reliability is not displayed. The editing operator can switch the reliability between display and hiding whenever the reliability hiding d is selected.

The in-editing 2002 is display of a super-imposed image in which color-coded squares indicating crack ratios are superimposed on an ortho-image of a captured image, similarly to the initial state 2001. The in-editing 2002 can be scrolled in the range direction to correspond to the initial state 2001. For example, when the initial state 2001 is scrolled, the in-editing 2002 is automatically scrolled and is displayed such that a display range of the captured image in the initial state 2001 is the same as a display range of the captured image in the in-editing 2002. Even when the in-editing 2002 is scrolled, the initial state 2001 is automatically scrolled and the display ranges of the captured image are the same. By setting the display ranges of the captured image in the initial state 2001 and the in-editing 2002 to the same, crack data for each square in the initial state and the in-editing can be easily compared.

The editing operator selects a square to be changed in the display of the in-editing 2002 using a mouse or a cursor key of a keyboard. A grid-line is displayed in the selected square. The editing operator can change the color of the square displayed on the display screen in the order of green→yellow→red→green whenever the square displayed by the grid-line is clicked with a mouse. FIG. 15 illustrates a case in which the square displayed by the grid-line is changed from yellow of the initial state to red. By changing the crack ratio for each square, it is possible to easily edit the crack ratio.

Selection buttons of Store h, Return to initial i, and Cancel j are disposed in the lower part of the display screen of the in-editing 2002. Each selection button can be selected, for example, by click with a mouse.

The Store h is a selection button for storing the editing result of the crack ratio edited in the in-editing 2002. When the Store h is selected, the crack ratio for each square changed in the in-editing 2002 is fixed and the editing result is stored in the input information storage 205. When the Store h is selected, display of the display screen of the editing process illustrated in FIG. 15 is switched to the crack editing TOP screen illustrated in FIG. 14, the editing status of the section subjected to the editing operation in the section editing information 2122 is "completion," and the editing date and time and the editor are displayed.

When the crack ratio for each square is not changed in the in-editing 2002 and the Store h is selected, the editing status of the section editing information 2122 is "completion," which can represent that the crack ratio of the section is confirmed by the editing operator.

The Return to initial i is a selection button for returning the editing result of the crack ratio edited in the in-editing 2002 to the initial state. Since the crack ratio is edited for each square, the editing results of a plurality of squares are displayed in the in-editing 2002. By selecting the Return to initial i, the editing results of the plurality of squares can be returned to the initial state together. The Return to initial i may return only a predetermined square to the initial state. The predetermined square is, for example, a latest square which is not returned to the initial state when a plurality of squares are edited. By selecting the Return to initial i multiple times, the editing results of multiple times can be returned to the initial state for each square. The predetermined square may be a plurality of squares included in a selected range. By returning the squares in a predetermined range to the initial state, it is possible to facilitate retrial of the editing operation.

The Cancel j is a selection button for ending the editing work and returning the display screen to the crack editing TOP screen illustrated in FIG. 14. When the Cancel j is selected, the editing result in the in-editing 2002 is not stored but discarded.

When the selection button of the Store h, the Return to initial i, or the Cancel j is selected, a dialog for checking an operation may be displayed to prevent an erroneous operation.

The selection part 2003 is display in which the captured image of a square selected in the in-editing 2002 is enlarged. By enlarging and displaying a captured image, the editing operator can determine validity of a detection result of a crack ratio displayed in the initial state 2001. In the selection part 2003, crack shape data may be displayed in the captured image. By displaying the crack shape data, the editing operator can check what image the pavement crack detector 106 determines to be a crack.

The selection part 2003 displays a captured image corresponding to nine squares centered on a square selected in the in-editing 2002. The frame line Z displayed in the selection part 2003 indicates the square selected in the in-editing 2002.

Slide bars of a Magnification e, a Brightness f, and a Gradation g are disposed in the lower part of the display screen of the selection part 2003. Setting of each slide bar can be changed, for example, by dragging the slide bar with a mouse.

The Magnification e is a slide bar for changing the magnification of the captured image displayed in the selection part 2003. The captured image displayed in the selection part is enlarged when the slide bar of the Magnification e is shifted to right, and the captured image displayed in the selection part is reduced when the slide bar is shift to left. When the captured image is enlarged or reduced, the size of the frame line Z displayed in the selection part 2003 is enlarged or reduced. By displaying the frame Z, the editing operator can check a range of the squares selected in the in-editing 2002 even when the captured image is enlarged or reduced.

The Brightness f is a slide bar for adjusting brightness (lightness) of the captured image displayed in the selection part 2003. The Gradation g is a slide bar for adjusting density (contrast) of the captured image displayed in the selection part 2003. By adjusting brightness and density of display of the captured image, the editing operator can easily view cracks included in the captured image. In this embodiment, an example in which brightness and density of display of the captured image can be adjusted has been described, but adjustment of display of the captured image is not limited thereto. For example, display adjustment of inverting negative/positive of the captured image may be performed. An image obtained by performing a differentiating process of enhancing an edge on the captured image may be displayed.

In FIG. 15, the editing screen 2000 in which the images of the initial state 2001, and the in-editing 2002, and the selection part 2003 are displayed is illustrated, but the display of the editing screen 2000 is not limited to FIG. 15.

For example, a captured image taken in the past in the same section and crack data based thereon may be displayed on the editing screen 2000 together. Pavement cracks are gradually enlarged due to aging and the number of cracks for each square increases. In comparison of the past captured image with the current (initial state) captured image, the current crack ratio is hardly lower than the past crack ratio when repairing is not performed. By displaying the past crack data to correspond to the current crack data on the editing screen 2000, a part which is erroneously detected can be easily found out in the current crack detection. By allowing the editing operator to concentrically confirm a part in which the current crack data is better than the past crack data, it is possible to enhance efficiency of editing work.

Squares edited in the past may be displayed to be identifiable on the editing screen 2000. Detection accuracy of cracks is affected by unevenness of a road surface or a shadow of a tree appearing on the road surface. At a predetermined position on the road surface at which erroneous detection of cracks was corrected in the past, there is a high likelihood that cracks will be erroneously detected again in a next detection. Since a part from which erroneous detection can be easily caused can be concentrically confirmed by displaying squares edited in the past to be identifiable on the editing screen 2000, it is possible to enhance efficiency of editing work. For example, crack data obtained by averaging the crack ratios edited in the past may be displayed on the squares edited in the past.

A report table which is prepared by the report table preparing and outputting unit 210 will be described below.

FIG. 16 is a diagram illustrating an example of a report table which is output from the pavement crack analysis device according to the second embodiment.

The report table which is illustrated in FIG. 16 and prepared by the report table preparing and outputting unit 210 includes the same entries as the report table which is prepared by the report table preparing and outputting unit 110 using FIG. 7. The report table prepared by the report table preparing and outputting unit 210 is different from the report table prepared by the report table preparing and outputting unit 110, in that display (display of editing completion) for identifying whether the crack ratio described for each section is an editing result in the editing operation is provided. The display of editing completion is, for example, a mark (*) described on the right side of a numeral of a crack ratio. The display of editing completion may be displayed using another method such as changing a font of the crack ratio or newly providing an entry of the display of editing completion. By describing the display of editing completion in the report table, it is possible to represent that the crack ratio of the section has been checked by the editing operator. When the report table is output, it may be set whether the display of editing completion should be described.

The pavement crack analysis device 2 illustrated in FIG. 12 generates the report table which has been described above with reference to FIG. 8, the display data using geographic information which has been described above with reference to FIG. 9, the screen data including a plurality of cracks-superimposed images which has been described above with reference to FIG. 10, and the calculation result of the variation in crack ratio which has been described above with reference to FIG. 11, in addition to the report table illustrated in FIG. 16, in the same way as in the pavement crack analysis device 1. That is, the functions of the inspection result output unit 209, the report table preparing and outputting unit 210, the display control unit 211, and the display unit 212 in the pavement crack analysis device 2 correspond to the functions of the inspection result output unit 109, the report table preparing and outputting unit 110, the display control unit 111, and the display 112 in the pavement crack analysis device 1 and thus description thereof as the functions of the pavement crack analysis device 2 will not be repeated.

Third Embodiment

Another example in the operation routine of the pavement crack analysis device according to the first embodiment described with reference to FIG. 4 will be described below as a third embodiment.

Figure 17:
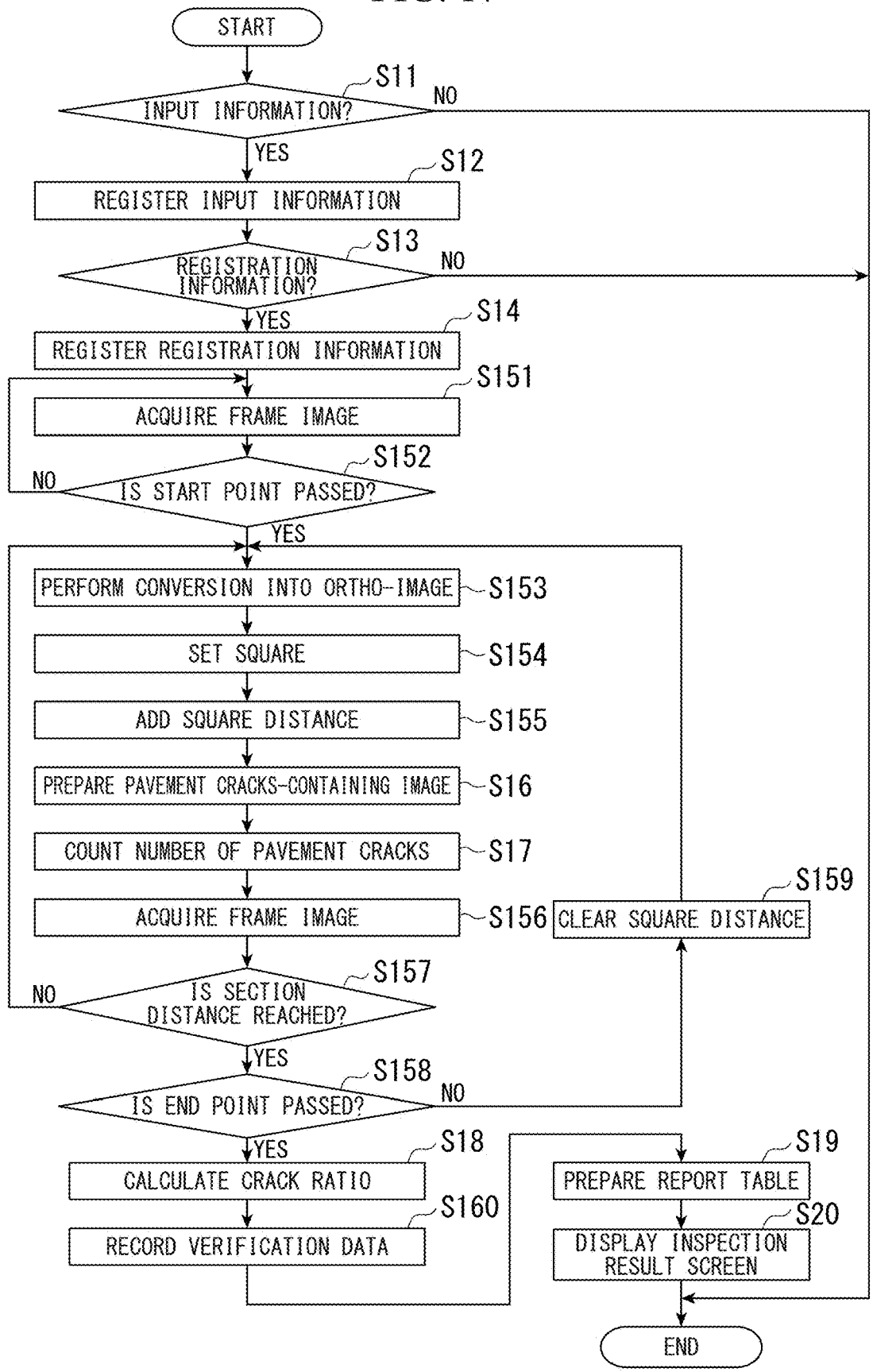
FIG. 17 is a flowchart illustrating an example of operations of a pavement crack analysis device according to a third embodiment.

FIG. 17 is a flowchart illustrating an example of an operation routine of the pavement crack analysis device according to the third embodiment. In the routine illustrated in FIG. 17, the pavement crack detecting process of Step S15 to the crack ratio calculating process of Step S18 which have described above with reference to FIG. 4 are performed on a route from a start point to an end point of a predetermined section. In FIG. 17, the same processes as illustrated in FIG. 4 are referenced by the same reference signs and description thereof will be partially omitted. The routine illustrated in FIG. 17 is performed by the functions of the pavement crack analysis device 1 similarly to FIG. 4, but performing of the routine is not limited to the functions described with reference to FIG. 4. In the following description, it is assumed that the routine illustrated in FIG. 17 is performed by the pavement crack analysis device 1.

In FIG. 17, in the process of Step S11 to the process of Step S14, the pavement crack analysis device 1 performs the same processes as described with reference to FIG. 4. That is, the input information acquirer 103 of the pavement crack analysis device 1 determines whether there is input information input from the input unit 101 (Step S11), and registers (stores) the input information in the input information storage 105 (Step S12) when it is determined that there is input information (YES in Step S11). The analysis operator registrator 104 determines whether there is registration information input from the registrator 102 (Step S13), and registers the registration information in the input information storage 105 (Step S14) when it is determined that there is registration information (YES in Step S13). On the other hand, when it is determined that there is no input information (NO in Step S11) or when it is determined that there is no registration information (NO in Step S13), the pavement crack analysis device 1 ends the routine illustrated in the flowchart of FIG. 4 (end).

After the process of Step S14 is performed, the pavement crack analysis device 1 acquires a frame image input from the captured image acquiring unit 1011 and stored in the input information storage 105 (Step S151). FIG. 17 illustrates a case in which an ortho-image of the road surface in a part included in a frame image acquired for each inter-frame distance is generated from the frame image. Accordingly, the process of acquiring a frame image in Step S151 is performed every inter-frame distance.

After the process of Step S151 is performed, the pavement crack analysis device 1 determines whether an imaging position passes through a start point (Step S152). In this embodiment, it is necessary to perform crack analysis in a section including at least the road surface from the start point of the route to the end point. The determination of whether the imaging position passes through the start point, which is performed in the process of Step S152, is performed by determining whether crack analysis can be performed on the road surface of the start point. When crack analysis can be performed on the road surface of the start point, it means that at least an ortho-image for a road surface image at the start point is generated and crack analysis is performed. Accordingly, when it is determined that the imaging position passes through the start point, crack analysis may be started from the road surface before the start point. The determination of whether the imaging position passes through the start point can be performed, for example, by comparing position information of longitude and latitude of the start point acquired from the section attribute information input unit 1012 described above with reference to FIG. 2 with position information from the GPS receiver mounted on the vehicle. Since the on-board camera mounted on the vehicle images the road surface at a predetermined viewing angle, the position of the road surface which is imaged by the on-board camera can be determined from the position information from the GPS receiver mounted on the vehicle. The determination of whether the imaging position passes through the start point may be performed by recognizing an image of an object such as a distance mark or a road construction imaging blackboard included in the captured image. The determination of whether the imaging position passes through the start point may be performed depending on whether a user performs a manual operation. A user may board the vehicle, confirm that the vehicle passes through the start point, and then perform a manual operation, or may perform a manual operation while confirming the captured image later.

When it is determined that the imaging position does not pass through the start point (NO in Step S152), the pavement crack analysis device 1 repeatedly performs the process of Step S151 and waits for passage of the imaging position through the start point.

On the other hand, when it is determined that the imaging position passes through the start point (YES in Step S155), the pavement crack analysis device 1 converts a frame image into an ortho-image (Step S153). Conversion into the ortho-image is performed on a predetermined part in the frame image acquired in the process of Step S151. For example, the pavement crack analysis device 1 converts an image of the road surface corresponding to the inter-frame distance included in the frame image into an ortho-image. The conversion into the ortho-image is performed by predetermined squares in the range direction. For example, the pavement crack detector 106 may generate an ortho-image corresponding to 0.5 m of one square or 1 m of two squares in the range direction. The size of the square of the ortho-image may be arbitrarily set. For example, the size of the square may be set to a rectangle with 1 feet (0.3048 m) in the width direction and two feet in the range direction. The size of the square may be appropriately changed depending on a section to be measured or conditions of the road surface.

Figure 18:
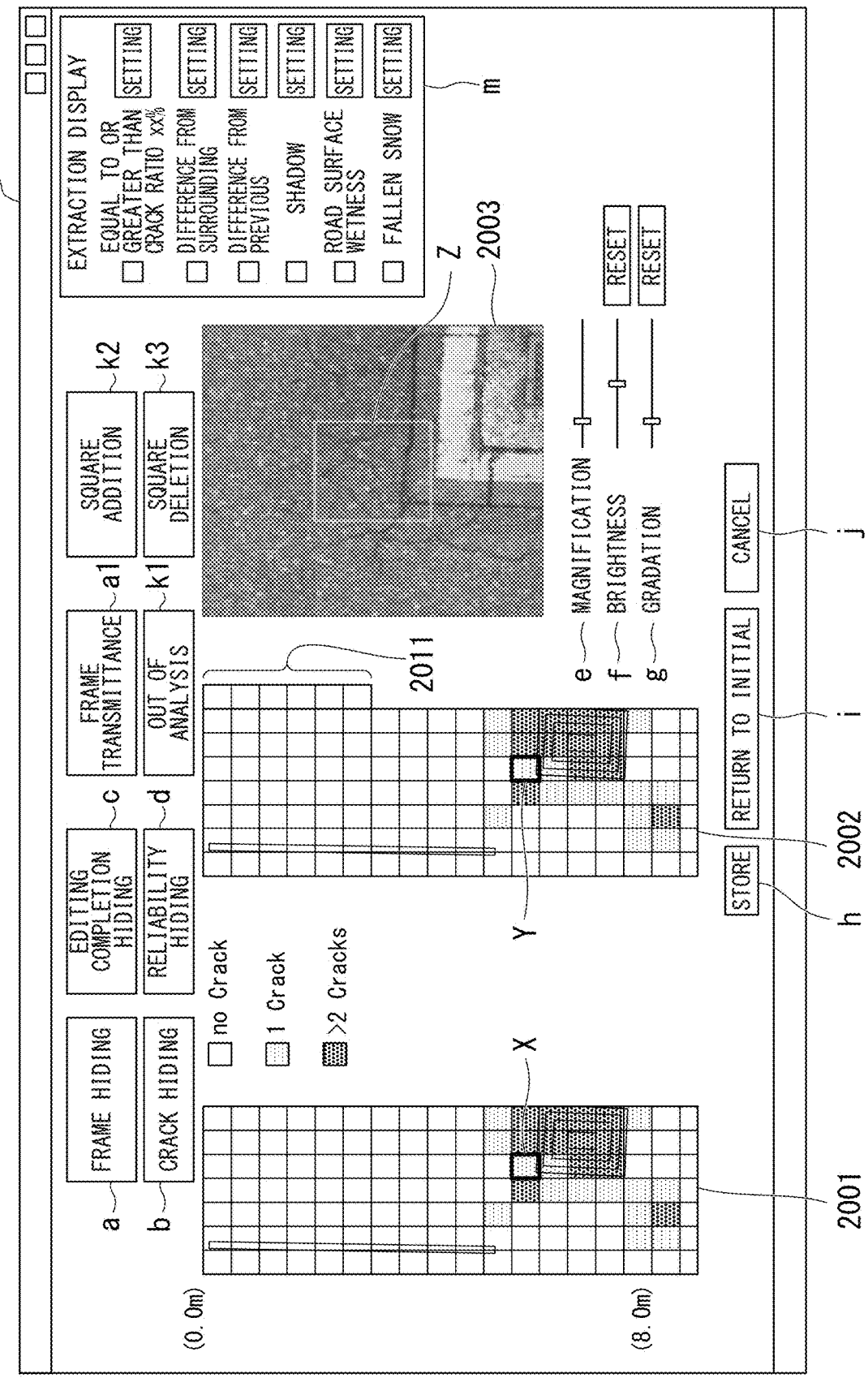
FIG. 18 is a diagram illustrating an example of an editing process which is performed by a pavement crack analysis device according to a fourth embodiment.

After the process of Step S153 is performed, the pavement crack analysis device 1 sets the squares for the prepared ortho-image (Step S154). The square serves to determine a range in which a crack ratio is calculated and an example in which the square is a mesh of 0.5 m is described in this embodiment. For example, when an ortho-image with a mesh of 0.5 m is generated in Step S153, the pavement crack analysis device 1 sets the square with a side of 0.5 m surrounding the generated ortho-image. The display mode of the square set in the process of Step S154 can be set in advance. Examples of the display mode of the square include a line color, a line thickness, a line type (such as a solid line, a broken line, a dotted line, or a double line), and line transmittance of the square. The display mode of the square may include setting of display or hiding of the square. The display mode of the square may be appropriately changed depending on a section to be measured or conditions of the road surface. For example, when predetermined conditions of extraction display which will be described later with reference to FIG. 18 are satisfied, the pavement crack analysis device 1 may change the display mode of the square satisfying the conditions to another display mode of the square. Specific conditions of the extraction display will be described later with reference to FIG. 18.

After the process of Step S154 is performed, the pavement crack analysis device 1 adds the square distances of the prepared ortho-image (Step S155). By adding the square distances, a cumulative value in the range direction of the squares prepared at the inter-frame distance can be acquired. For example, when the square set for the ortho-image in Step S154 is 0.5 m in the range direction, the distance of 0.5 m is added to the cumulative value in the process of Step S155.

After the process of Step S155 is performed, similar to the routine illustrated in FIG. 4, the pavement crack analysis device 1 detects pavement cracks included in the ortho-image and generates a cracks-superimposed image in which the detected pavement cracks are superimposed on the captured image (Step S16). When an ortho-image corresponding to one square (0.5 m) in the range direction is generated in the process of Step S153, the pavement crack detector 106 prepares a cracks-superimposed image for the ortho-image corresponding to one square.

After the process of Step S16 is performed, the pavement crack analysis device 1 counts the number of pavement cracks included in the square on the basis of the pavement crack detected by the pavement crack detector 106 (Step S17).

After the process of Step S17 is performed, similar to the process of Step S151, the pavement crack analysis device 1 acquires a frame image input from the captured image acquiring unit 1011 and stored in the input information storage 105 (Step S156).

After the process of Step S156 is performed, the pavement crack analysis device 1 determines whether the cumulative value in the range direction of the squares added in the process of Step S155 reaches the section distance (Step S157). When it is determined that the cumulative value in the range direction of the squares does not reach the section distance (NO in Step S157), the pavement crack analysis device 1 returns the routine to Step S153 and repeats the processes of Steps S153 to S157.

On the other hand, when it is determined that the cumulative value in the range direction of the squares reaches the section distance (YES in Step S157), the pavement crack analysis device 1 determines whether the imaging position passes through the end point (Step S158). Similar to the determination of whether the imaging position passes through the start point, the determination of whether the imaging position passes through the end point can be performed by comparing longitude and latitude information of the end point acquired from the section attribute information input unit 1012 with the position information acquired from the GPS receiver mounted on the vehicle. The pavement crack analysis device 1 may determine whether the imaging position passes through the end point by recognizing an object such as a distance mark included in the captured image or by a user's manual operation.

The frame image acquired in the process of Step S156 when it is determined that the imaging position passes through the end point includes an image of the road surface after the end point. For example, by setting a position at which it is determined that the imaging position passes through the end point to a position by the inter-frame distance after the end point, the road surface of the end point can be included in the ortho-image generated from the frame image.

When it is determined that the imaging position does not pass through the end point (NO in Step S158), the pavement crack analysis device 1 clears the square distance which has been accumulated and added (Step S159). After the process of Step S159 is performed, a next frame image is acquired in the process of Step S153.

On the other hand, when it is determined that the imaging position passes through the end point (YES in Step S158), the pavement crack analysis device 1 calculates a crack ratio (Step S18). The pavement crack analysis device 1 may store the counted number of cracks and the calculated crack ratio as crack data in the inspection result data storage 108.

After the process of Step S18, the pavement crack analysis device 1 records verification data (Step S160). The verification data is data for verifying that the road surface of which the crack ratio is calculated is a correct inspection target as described above. In the process of Step S160, it is possible to verify that inspection is satisfactorily performed on an ortho-image included in a frame image captured for each inter-frame distance, for example, by recording an ortho-image of which the crack ratio is calculated, the number of ortho-images of which the crack ratio is calculated, or a cumulative distance in the range direction of the ortho-image of which the crack ratio is calculated. By recording the verification data for each ortho-image, the verification data may be used as basic data when the cumulative value of the inter-frame distances or the number of frame images captured at the inter-frame distance is used as verification data. For example, when the cumulative value of the distances of the ortho-images reaches the inter-frame distance, the cumulative value of the inter-frame distances may be added. When the cumulative value of distances of the ortho-images reaches the inter-frame distance, the number of frame images captured at the inter-frame distance may be added.

After the process of Step S160 is performed, the pavement crack analysis device 1 prepares a report table (Step S19). The prepared report table may include the above-mentioned verification data. That is, the report table may include verification data such as the cumulative value of the inter-frame distances, the number of frame images captured at the inter-frame distance, image data of the ortho-image from which the crack ratio is calculated, the number of ortho-images from the crack ratio is calculated, or the cumulative distance in the range direction of the ortho-images from which the crack ratio is calculated. The report table may include the above-mentioned verification data and may include information indicating a location over the network (for example, a two-dimensional code) such as a uniform resource locator (URL) indicating a location in which the verification data is stored.

After the process of Step S19 is performed, the pavement crack analysis device 1 displays a screen indicating an inspection result on the display 112 (Step S20). For example, the inspection result displayed on the display 112 is the cracks-superimposed images, the crack ratios, or a report table which is prepared in Step S19 on the basis of such data. That is, the display control unit 111 may display the verification data on the display 112. After the process of Step S20 is performed, the routine illustrated in the flowchart of FIG. 17 is ended.

In the process of acquiring a frame image in Step S156, it is preferable that the frame image be acquired from a part having a large angle of depression from the on-board camera in the frame image. Since a part having a large angle of depression from the on-board camera has a higher resolution of the road surface than a part having a small angle of depression, it is possible to enhance a resolution of an ortho-image by generating the ortho-image on the basis of the part having a large angle of depression and to improve detection accuracy of a pavement crack. The frame image for measuring the section distance and the frame image for generating an ortho-image may be acquired at different frequencies. The frame image is a still image of a moving image captured with the on-board camera and is, for example, an image corresponding to one frame of the moving image taken 30 frames per second. For example, when a defect occurs in the frame image due to vibration of the vehicle or the like, a previous or subsequent frame image may be acquired instead in the process of Step S156.

Fourth Embodiment

Another example of the editing process in the second embodiment will be described below as a fourth embodiment.

FIG. 18 is a diagram illustrating an example of an editing process in a pavement crack analysis device according to a fourth embodiment. In FIG. 18, the same functions as illustrated in FIG. 15 are referenced by the same reference signs and description thereof is partially omitted. FIG. 18 illustrates another example of the display screen of the editing process which is displayed on the display unit 212 when a hyperlink of a section in FIG. 14 is selected. The editing screen 2000 includes editing display parts of an initial state 2001, an in-editing 2002, and a selection part 2003 similarly to FIG. 15.

In the upper part of the display screen, the editing screen 2000 includes selection buttons of a frame hiding a, a crack hiding b, an editing completion hiding c, and a reliability hiding d, which are described in FIG. 15, are disposed. The editing screen 2000 also includes a Frame transmittance a1, an Out of analysis k1, a Square addition k2, and a Square deletion k3. A selected state of each selection button can be changed, for example, by click with a mouse.

The Frame transmittance a1 is a selection button for setting transmittance of a line of a square which is superimposed on a captured image of the initial state 2001. It is assumed that the frame transmittance can be set between transparency (transmittance of 100%) to opaqueness (transmittance of 0%). The Frame transmittance a1 may serve to set a display mode of a square such as a line type (such as a solid line, a broken line, a dotted line, and a double line), a color of a square, or a line thickness of a square as well as to set transmittance. The Frame transmittance a1 may serve to change transmittance depending on brightness, contrast, hue, and the like of an image of a road surface. The Frame transmittance a1 may serve to change transmittance or the like for a square to be edited.

The Out of analysis k1 is a selection button for setting a square to be out of analysis. Setting of being out of analysis means that the set square is out of calculation of a crack ratio. Fallen snow, fallen objects such as fallen leaves, sedimentary sand and soil, shadows of structures, or the like may be present on the road surface to be imaged. A road surface other than an analysis target may be imaged depending on a traveling state of the vehicle imaging the road surface. A captured image may be blurred due to vibration of the on-board camera or the like. Such a captured image serves as a reason for erroneous detection of pavement cracks and is preferably set to be out of analysis when calculating a crack ratio. By pressing the Out of analysis k1, it is possible to a square which is set to be out of analysis. Selection of a square is performed, for example, by clicking or designating a square desired to be out of analysis in a range. The square set to be out of analysis may be identified by changing the color or shape of the square.

The Square addition k2 is a selection button for adding a square to be analyzed. In this embodiment, an ortho-image generated from a frame image has a fixed value in the width direction. However, an actual road is widened or narrowed in the middle of a section, that is, is changed in road width. When it is desired to widen the width of a road to be analyzed, it is possible to add a square to the in-editing 2002 by pressing the Square addition k2. An added part 2004 indicates that a square is added by the Square addition k2. Designation of a square to be added can be performed by clicking the square, similarly to the operation of the Out of analysis k1. For example, when a square is added to a narrow range, a square for each square in a dragged range can be added by clicking or dragging the added position with a mouse. When a road width is widened at a certain distance, a square in the width direction may be added to a part after the position designated with a mouse or the like. Addition or deletion of a square may be automatically changed by automatically detecting a road width. For example, the road width may be automatically detected by detecting the centerline and the side line. The road width may be automatically detected by detecting asphalt. Addition of a square may be set to include an imaged part in which the vehicle does not travel such as a zebra crossing. An ortho-image to be added differs depending on the range of the road surface included in a captured frame image. The direction or the viewing angle of the on-board camera when imaging the road surface may be appropriately adjusted depending on road width conditions of a section. Generation of an ortho-image of a part to be added may be performed in advance at the same time as the part is first displayed in the in-editing 2002 or may be newly performed on the basis of a frame image after the part to be added is designated. When an ortho-image to be added is generated in advance, rapid display is possible by changing a display range of an ortho-image when a square is added. On the other hand, when a frame image is generated after the part to be added is designated, time is required until an ortho-image is displayed, but an amount of ortho-images which are prepared in advance can be reduced and thus it is possible to reduce an amount of data which is used to store the ortho-images.

The Square deletion k3 is a selection button for deleting a square to be analyzed which is added by the Square addition k2. The square added to the in-editing 2002 can be deleted by pressing the Square deletion k3 and designation of a square to be deleted can be performed by click with a mouse, similarly to the operation of the Out of analysis k1. The Square deletion k3 may be functionally replaced with the Out of analysis k1.

The editing screen 2000 includes a setting screen of extraction display m. The extraction display is a setting screen for displaying a square extracted under predetermined conditions in the initial state 2001 or the in-editing 2002 by changing the display mode (such as a color or a shape) of the square. The extraction display m includes check boxes of entries such as "equal to or greater than crack ratio xx %," "difference from surrounding," "difference from previous," "shadow," "road surface wetness," and "fallen snow." Each entry includes a setting button for setting the entry. When a check box is selected, the display mode of the square extracted under the conditions of the selected entry is changed. The entry set in the extraction display m is a condition which should be noted in pavement crack analysis. By changing and displaying the display mode of the extracted square, a user can easily view a part to be noted.

The "equal to or greater than crack ratio xx %" is an entry for changing display of a square when the crack ratio in a set range is equal to or greater than a set value "xx %". A part having a high crack ratio means a part requiring repair. A user can determine the necessity for repair by viewing the part having a high crack ratio. It is assumed that the numerical value of "xx" can be arbitrarily set by a setting button. The range for extracting the crack ratio is, for example, a range displayed in the in-editing 2002. The range for extracting the crack ratio may be set to ten squares which are continuous in the range direction or ten squares which are adjacent to each other.

The "difference from surrounding" is an entry for extracting a part in which the crack ratio is different from the surrounding. For example, when a part in which the crack ratio is lower than that of the surrounding is present in a section having a high crack ratio or when a part in which the crack ratio is higher than that of the surrounding is present in a section having a low crack ratio, erroneous detection, imaging failure, or the like may occur. By displaying the "difference from surrounding," a user can be notified of a part of the road surface to be noted. Whether it is "different" can be arbitrarily set by a setting button. For example, a difference in crack ratio from the previous time may be set and the part may be extracted when the crack ratio is different from the surrounding by the set difference or more.

The "difference from previous" is an entry for extracting a part of which the crack ratio is different from the previous measurement. For example, when the crack ratio is different from the previous measurement, the road surface may be locally damaged, repairing may have been performed, or imaging may fail. By displaying the "difference from previous," a user can be notified of a part of the road surface to be noted. The ratio of "difference" may be arbitrarily set by a setting button, similarly to the "difference from surrounding." A range in which the difference in crack ratio is compared may be arbitrarily set.

"Shadow," "road surface wetness," and "fallen snow" are entries for detecting a road surface state which affects measurement of cracks in the road surface as described above. A shadow on the road surface, wetness of the road surface, and the fallen snow can be detected by performing predetermined image processing on the captured images. By causing a user to note the part from which such entries have been extracted, a user can easily confirm a detection state of a crack. In detecting such entries, extraction conditions can be set by corresponding setting buttons. For example, setting of a differentiating process on an image or setting of features of an image captured in the past may be performed.

Fifth Embodiment

A process of editing crack shape data will be described below.

Figure 19:
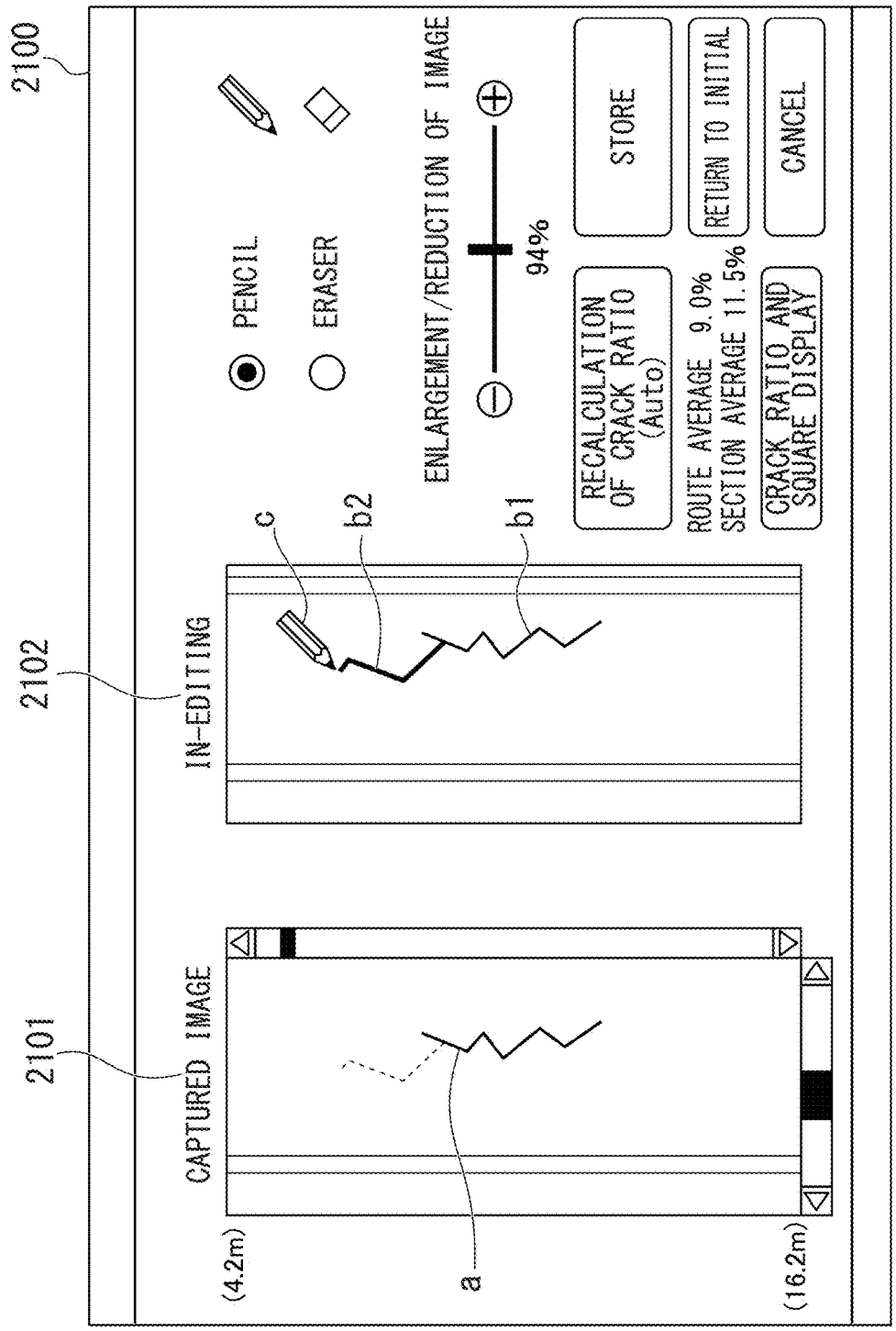
FIG. 19 is a diagram illustrating an example of an editing process which is performed by a pavement crack analysis device according to a fifth embodiment.

FIG. 19 is a diagram illustrating an example of a process of editing crack shape data in the pavement crack analysis device 1 according to the second embodiment as a fifth embodiment.

In FIG. 19, an editing screen 2100 includes editing display parts of a captured image 2101 and an in-editing 2102. The editing screen 2100 includes selection icons of "pencil" and "eraser." The editing screen 2100 includes a slider of "image enlargement/reduction." The editing screen 2100 includes buttons of "Crack ratio recalculation," "Crack ratio and square display," "Store," "Return to initial," and "Cancel."

The captured image 2101 displays an ortho-image of a captured image. Display of (4.2 m) and (16.2 m) at the left end of the captured image 2101 indicate a distance from a start point of a section. The editing operator can display a captured image in an arbitrary range between the start point and the end point of the section by scrolling the image of the captured image 2101 in the range direction. The captured image 2101 can be scrolled in the width direction.

A centerline of a road appears in the left part of the captured image 2101. A side line of the road appears in the right part. In this embodiment, calculation of a crack ratio is performed on a lane interposed between the centerline and the side line. An image of pavement cracks a is displayed in the captured image 2101. The pavement cracks a is an image in an imaged state and a broken line indicates that the width of the cracks is small.

In the in-editing 2102, crack shape data b1 of the detected pavement cracks is superimposed and displayed on the captured image. In the crack shape data b1, only a part of the pavement cracks a is detected and displayed. It is assumed that a part of the pavement cracks a with a small width indicated by the broken line is not detected. Crack shape data b2 indicates a part which is drawn and added by the selection icon of "pencil."

The selection icon of "pencil" includes a radio button for drawing and adding crack shape data to the in-editing 2102. By selecting the radio button of "pencil," a pencil icon c is displayed in the in-editing 2102 and crack shape data can be drawn by a user's operation thereof. The selection icon of "eraser" includes a radio button for erasing crack shape data (for example, the crack shape data b1) detected from a captured image and crack shape data (for example, the crack shape data b2) drawn in the in-editing 2102 with "pencil." By selecting the radio button of "eraser," an icon of a eraser which is not illustrated is displayed in the in-editing 2102 and the crack shape data which is displayed can be erased by a user's operation thereof.

By performing editing of adding or deleting the crack shape data using "pencil" or "eraser," it is possible to edit (correct) crack shape data which is not detected and crack shape data which is erroneously detected. The edited crack shape data b2 may be different from the detected crack shape data b1 in the display mode (such as a color and a shape). The edited crack shape data may be returned to an original state by operation of "Return to initial" or "Undo" which is not illustrated.

The slider of "image enlargement/reduction" is an operation part for enlarging or reducing an image displayed in the editing display parts of the captured image 2101 and the in-editing 2102. A user can reduce or enlarge an image by moving the slider to right and left. Enlargement, reduction, and scrolling of an image may be performed by a predetermined operation of a keyboard or a mouse.

The "Crack ratio recalculation" is a button for recalculating a crack ratio based on the crack shape data edited using "pencil" or the like. A mark "Auto" in the button indicates that the crack ratio is automatically recalculated at the time of editing the crack shape data using "pencil" or the like. Recalculation of a crack ratio may be performed by a user's manual operation thereof. FIG. 19 illustrates a case in which a route average value and a section average value are displayed as the crack ratio. The range for calculating the crack ratio may be set to, for example, a range which is displayed in the in-editing 2102 or a specific part which is designated by a user. By displaying the recalculated crack ratio, a user can easily confirm an influence which editing of the crack shape data gives to the crack ratio.

The "Crack ratio and square display" is a button for superimposing a square with a shape indicating the crack ratio described above with reference to FIG. 15 or the like on the captured image 2101 or the in-editing 2102. By displaying a square of a shape indicating the crack ratio, a user can easily confirm an influence which editing of the crack shape data gives to a partial crack ratio.

The "Store" is a button for storing the editing result of the crack shape data which is edited in the in-editing 2102. When the "Store" is pressed, the crack shape data which is edited in the in-editing 2102 is fixed and the editing result is stored in the input information storage 205.

The "Return to initial" is a button for returning the editing result of the crack shape data which is edited in the in-editing 2102 to the initial state. By pressing the "Return to initial," the editing result can be returned to the initial state at a time. The "Return to initial" may serve to return only a part displayed in the in-editing 2102 to the initial state.

The "Cancel" is a button for ending the editing work. When the "Cancel" is pressed, the editing result in the in-editing 2102 is not stored but is discarded.

When the button of "Store," "Return to initial," or "Cancel" is selected, a dialog for checking an operation may be displayed to prevent an erroneous operation.

Another example of the pavement crack analysis system described above with reference to FIG. 12 will be described below.

FIG. 21 is a block diagram illustrating another example of the functional configuration of the pavement crack analysis system according to the second embodiment.

In FIG. 21, the crack analysis system includes a pavement crack analysis device 1 and a pavement crack analysis device 2. The same functions as described with reference to FIG. 12 among the functions of the pavement crack analysis device 1 and the pavement crack analysis device 2 illustrated in FIG. 21 are referenced by the same reference signs and description thereof will be partially omitted.

In FIG. 21, the pavement crack analysis device 1 further includes an input unit 114 in addition to the pavement crack analysis device 1 illustrated in FIG. 12. The pavement crack analysis device 2 further includes an output unit 220 in addition to the pavement crack analysis device 2 illustrated in FIG. 12. The input unit 114 acquires data output from the output unit 220 via the network 3 or a recording medium. For example, the output unit 220 outputs crack shape data which is edited in the editing screen 2100 described with reference to FIG. 19. The edited crack shape data is acquired from the input unit 114 by the pavement crack analysis device 1 and can be processed by the crack ratio calculator 107. For example, when the function of the crack ratio calculator 107 is more enhanced than the function of the crack ratio calculator 207, the crack analysis system includes the input unit 114 and the output unit 220 and thus the crack shape data edited by the pavement crack analysis device 2 can be processed by the crack ratio calculator 107. In FIG. 12, the functions of the pavement crack analysis device 2 are the same as the functions of the pavement crack analysis device 1, but the function of the pavement crack analysis device 2 can be simplified by causing the pavement crack analysis device 1 to process data output from the pavement crack analysis device 2.

The pavement crack analysis device 2 does not have the functions of the inspection result output unit 109, the report table preparing and outputting unit 110, the display control unit 111, and the display 112 of the pavement crack analysis device 2 illustrated in FIG. 12. That is, the pavement crack analysis device 2 is an embodiment which can operate with the functional configuration illustrated in FIG. 21. By simplifying the function of the pavement crack analysis device 2, it is possible to reduce costs of the pavement crack analysis device 2.

The pavement crack analysis device 1 and the pavement crack analysis device 2 are not limited to the configuration illustrated in FIG. 12 or 21. For example, the pavement crack analysis device 2 may have a function of performing only an editing operation of editing a crack ratio or crack shape data. An example of the case in which the pavement crack analysis device 2 have a function of performing only the editing operation is a case in which the pavement crack analysis device 2 has a function of a web browser. The pavement crack analysis device 1 can have a web server function and can provide an editing UI to a web browser connected thereto via the network 3 to enable editing. Since image data or crack data which is not used for editing does not need to the pavement crack analysis device 2 side, it is possible to reduce a load of data transmission and reception and to reduce costs of the pavement crack analysis device 2.

According to at least one of the above-mentioned embodiments, since the crack analysis device includes the captured image acquiring unit, the crack detecting unit, and the crack ratio calculator, it is possible to achieve enhancement in efficiency of the pavement crack analyzing process.

In this embodiment, the method of calculating a crack ratio to be 100% when two or more cracks are present in a square with a mesh of 0.5 m, 60% when one crack is present, and 0% when no cracks are present has been described above in the crack analyzing process, but another method may be used for the crack analyzing process. For example, an analysis process of determining evaluation for cracks depending on a road surface state such as a width, a depth, a direction, or a shape (such as a straight line shape, a curved line shape, or a polygonal shape) of cracks may be performed. When there is the same number of cracks (the crack ratio) and there are different widths of the cracks, necessity for repair of pavement may differ. A method of other than the above-mentioned calculation method may be used as the crack ratio calculating method. The crack ratio calculating method is determined on the basis of a predetermined reference, but a crack analyzing process with a crack ratio calculating method changed with a change of the reference may be performed. The method which is used for the crack analyzing process is setting information (information for setting a processing algorithm, a processing method of processing parameters, and the like) of the crack ratio calculator 107, and may be acquired from the registrator 102 illustrated in FIG. 1 and stored in the pavement crack detector 106.

The above-mentioned pavement crack analysis device may be embodied by a computer. In this case, a program for realizing the functions of the functional blocks is recorded on a computer-readable recording medium. The pavement crack analysis device may be realized by causing a computer system to read the program recorded on the recording medium and causing a central processing unit (CPU) to execute the program. The "computer system" which is mentioned herein includes an operating system (OS) or hardware such as peripherals. Examples of the "computer-readable recording medium" include a portable medium such as a flexible disk, a magneto-optical disk, a read only memory (ROM), or a CD-ROM. Examples of the "computer-readable recording medium" include a storage device such as a hard disk built in a computer system. The "computer-readable recording medium" may include a medium that dynamically holds a program for a short time. An example of the medium that dynamically holds a program for a short time is a communication line when a program is transmitted via a network such as the Internet or a communication line such as a telephone circuit. The "computer-readable recording medium" may include a medium that holds a program for a predetermined time like a volatile memory in a computer system serving as a server or a client. The program may serve to realize a part of the above-mentioned functions. The program may serve to realize the above-mentioned functions in combination with another program stored in advance in the computer system. The program may be embodied using a programmable logic device. An example of the programmable logic device is a field programmable gate array (FPGA).

The functional units of the pavement crack analysis device 1 and the pavement crack analysis device 2 have described above to be software functional units, but some or all of the functional units of the pavement crack analysis device 1 may be hardware functional units such as an LSI.

While some embodiments of the present invention have been described above, these embodiments are presented as examples and are not intended to limit the scope of the invention. These embodiments can be embodied in various forms and can be subjected to various omissions, substitutions, and modifications without departing from the gist of the invention. The embodiments or modifications thereof are included in the scope or gist of the invention and are also included in the scope of the invention described in the appended claims and equivalence thereto.

What is claimed is:

1. A crack analysis device comprising:
   a captured image acquiring unit configured to acquire a captured image which is obtained by imaging a road surface;
   a crack detecting unit configured to detect cracks of the imaged road surface on the basis of the captured image; and
   a crack ratio calculator configured to calculate a crack ratio indicating a ratio of an area of the cracks to a predetermined area on the basis of the detected cracks, wherein the crack ratio calculator calculates the crack ratio for each of sections into which a road surface is divided with a predetermined area and generates display data in which display is changed for each section on the basis of the calculated crack ratio.

2. The crack analysis device according to claim 1, further comprising:
   an image generating unit configured to generate a cracks-superimposed image in which crack shape data indicating a shape of the cracks is superimposed on the captured image;
   a position data acquiring unit configured to acquire position data indicating a position at which the captured image is acquired;
   an image data storing unit configured to store the cracks-superimposed image in correlation with the position data; and
   an image generating unit configured to generate an image for displaying a plurality of cracks-superimposed images.

3. The crack analysis device according to claim 1, further comprising a display data preparing unit configured to prepare display data for superimposing and displaying the crack ratio on geographical information in which a route appears.

4. The crack analysis device according to claim 1, further comprising a section attribute information input unit configured to acquire section attribute information of a route of which the captured image is acquired, wherein the crack ratio calculator calculates the crack ratio for each section of the route on the basis of the section attribute information.

5. The crack analysis device according to claim 1, further comprising:
   an input unit configured to acquire the captured image and crack data indicating a ratio of an area of the cracks to a predetermined area which is calculated on the basis of the captured image;
   a crack data editing unit configured to generate an editing screen for providing the acquired captured image and display based on the crack data which is editable by a user's operation; and
   an editing result storing unit configured to store an editing result in response to the user's operation.

6. The crack analysis device according to claim 5, wherein the crack data editing unit displays the captured image and a cracks-superimposed image in which crack shape data indicating a shape of the cracks is superimposed on the captured image for comparison with each other.

7. The crack analysis device according to claim 1, further comprising a section attribute information input unit configured to acquire section attribute information including a position of a start point and a position of an end point of a route of which the captured image is acquired, wherein the captured image acquiring unit acquires the captured image of a target section including at least sections from the position of the start point to the position of the end point.

8. The crack analysis device according to claim 7, further comprising a verification information generating unit configured to generate information for verifying that the crack ratio is calculated on the basis of the target section.

9. The crack analysis device according to claim 1, wherein the crack detecting unit calculates a distance on the road surface from after one captured image is captured and until a next captured image is captured and calculates a distance at which the captured image is acquired on the basis of the calculated distance on the road surface.

10. The crack analysis device according to claim 1, further comprising a crack shape data editing unit configured to generate a crack shape data editing screen for editing crack shape data indicating a shape of the cracks, wherein the crack ratio calculator calculates the crack ratio on the basis of the edited crack shape data.

11. The crack analysis device according to claim 1, further comprising a square display unit configured to set a display mode of squares indicating subdivisions into which the road surface is divided with a predetermined area and which are used to calculate the crack ratio.

12. A crack analysis method comprising:
   a captured image acquiring step of acquiring a captured image which is obtained by imaging a road surface;
   a crack detecting step of detecting cracks of the imaged road surface on the basis of the captured image; and
   a crack ratio calculating step of calculating a crack ratio indicating a ratio of an area of the cracks to a predetermined area on the basis of the detected cracks, wherein the crack ratio calculating step includes calculating the crack ratio for each of sections into which a road surface is divided with a predetermined area and generating display data in which display is changed for each section on the basis of the calculated crack ratio.

13. The crack analysis method according to claim 12, further comprising:
   an image generating step of generating a cracks-superimposed image in which crack shape data indicating a shape of the cracks is superimposed on the captured image;
   a position data acquiring step of acquiring position data indicating a position at which the captured image is acquired;
   an image data storing step of storing the cracks-superimposed image in correlation with the position data; and
   an image generating step of generating an image for displaying a plurality of cracks-superimposed images.

14. The crack analysis method according to claim 12, further comprising a report table preparing step of preparing a predetermined report table on the basis of the crack ratio.

15. The crack analysis method according to claim 12, further comprising a display data preparing step of preparing display data for superimposing and displaying the crack ratio on geographical information in which a route appears.

16. The crack analysis method according to claim 12, further comprising a section attribute information acquiring step of acquiring section attribute information of a route of which the captured image is acquired, wherein the crack ratio calculating step includes calculating the crack ratio for each section of the route on the basis of the section attribute information.

17. The crack analysis method according to claim 12, further comprising:
   an input step of acquiring the captured image and crack data indicating a ratio of an area of the cracks to a predetermined area which is calculated on the basis of the captured image;
   an editing step of generating an editing screen for providing the acquired captured image and display based on the crack data which is editable by a user's operation; and
   an editing result storing step of storing an editing result in response to the user's operation.

18. The crack analysis method according to claim 17, wherein the editing step includes displaying the captured image and a cracks-superimposed image in which crack shape data indicating a shape of the cracks is superimposed on the captured image for comparison with each other.

19. A non-transitory computer readable storage medium that stores a computer program to be executed by the computer to perform:
   a captured image acquiring process of acquiring a captured image which is obtained by imaging a road surface;
   a crack detecting process of detecting cracks of the imaged road surface on the basis of the captured image; and
   a crack ratio calculating process of calculating a crack ratio indicating a ratio of an area of the cracks to a predetermined area on the basis of the detected cracks, wherein the crack ratio calculating process includes calculating the crack ratio for each of sections into which a road surface is divided with a predetermined area and generating display data in which display is changed for each section on the basis of the calculated crack ratio.

20. The non-transitory computer readable storage medium according to claim 19, wherein the computer program further performs:

an image generating process of generating a cracks-superimposed image in which crack shape data indicating a shape of the cracks is superimposed on the captured image;

a position data acquiring process of acquiring position data indicating a position at which the captured image is acquired;

an image data storing step of storing the cracks-superimposed image in correlation with the position data; and an image generating process of generating an image for displaying a plurality of cracks-superimposed images.

21. The non-transitory computer readable storage medium according to claim 19, wherein the computer program further performs:

a report table preparing process of preparing a predetermined report table on the basis of the crack ratio.

22. The non-transitory computer readable storage medium according to claim 19, wherein the computer program further performs:

a display data preparing step of preparing display data for superimposing and displaying the crack ratio on geographical information in which a route appears.

23. The non-transitory computer readable storage medium according to claim 19, wherein the computer program further performs:

a section attribute information acquiring step of acquiring section attribute information of a route of which the captured image is acquired, wherein the crack ratio calculating process includes calculating the crack ratio for each section of the route on the basis of the section attribute information.

24. The non-transitory computer readable storage medium according to claim 19, wherein the computer program further performs:

an input process of acquiring the captured image and crack data indicating a ratio of an area of the cracks to a predetermined area which is calculated on the basis of the captured image; an editing process of generating an editing screen for providing the acquired captured image and display based on the crack data which is editable by a user's operation; and an editing result storing process of storing an editing result in response to the user's operation.

25. The non-transitory computer readable storage medium according to claim 24, wherein the editing process includes displaying the captured image and a cracks-superimposed image in which crack shape data indicating a shape of the cracks is superimposed on the captured image in comparison with each other.

* * * * *